US006349237B1

(12) United States Patent
Koren et al.

(10) Patent No.: US 6,349,237 B1
(45) Date of Patent: Feb. 19, 2002

(54) RECONFIGURABLE MANUFACTURING SYSTEM HAVING A PRODUCTION CAPACITY METHOD FOR DESIGNING SAME AND METHOD FOR CHANGING ITS PRODUCTION CAPACITY

(75) Inventors: Yoram Koren, Ann Arbor; A. Galip Ulsoy, Dexter, both of MI (US)

(73) Assignee: The Regents of the University of Michigan, Ann Arbor, MI (US)

(*) Notice: Subject to any disclaimer, the term of this patent is extended or adjusted under 35 U.S.C. 154(b) by 0 days.

(21) Appl. No.: 09/085,562

(22) Filed: May 27, 1998

Related U.S. Application Data

(63) Continuation-in-part of application No. 08/997,140, filed on Dec. 23, 1997, now Pat. No. 5,943,750.
(60) Provisional application No. 60/070,959, filed on Jan. 9, 1998.

(51) Int. Cl.[7] .............................................. G06F 19/00
(52) U.S. Cl. ........................... 700/96; 700/94; 700/39; 705/7; 714/712
(58) Field of Search ............................. 700/96, 94, 39, 700/78, 47, 99, 103, 105, 116, 112, 121, 230; 708/100, 230, 231; 715/313; 712/20; 714/712, 821, 714, 708; 705/7

(56) References Cited

U.S. PATENT DOCUMENTS

| | | | |
|---|---|---|---|
| 4,237,598 A | * 12/1980 | Williamson | 29/568 |
| 4,783,782 A | 11/1988 | Morton | |
| 4,807,108 A | 2/1989 | Ben-Arieh et al. | |
| 4,816,757 A | 3/1989 | Hutchins | |
| 4,909,067 A | * 3/1990 | Hayes | 73/29.01 |
| 5,155,679 A | 10/1992 | Jain et al. | |
| 5,181,898 A | * 1/1993 | Piotrowski | 493/3 |
| 5,247,861 A | 9/1993 | Jahn | |
| 5,456,332 A | 10/1995 | Borenstein | |
| 5,467,285 A | * 11/1995 | Flinn et al. | 364/468.01 |

(List continued on next page.)

OTHER PUBLICATIONS

Goldman, S., Nagel, R. and K. Preiss, 1995, "Agile Competitors and Virtual Organizations", 1995.
Hu, S.J., 1997, "Stream of Variation Theory and Its Application to Body Assembly", CIRP Annals, 1997.
Koren, Y., Pasek, Z.J., Ulsoy, A.G. and U. Benchetrit, "Real–Time Open Control Architectures and System Performance", Annals Of The CIRP, vol. 45. No. 1, 1996.
Villasenor, J. and W.H. Mangione–Smith, 1997, "Configurable Computing", Scientific American, Jun. 1997.

*Primary Examiner*—Ayaz Sheikh
*Assistant Examiner*—Firmin Backer
(74) *Attorney, Agent, or Firm*—Brooks & Kushman P.C.

(57) ABSTRACT

A reconfigurable manufacturing system (RMS) having an adjustable structure is designed based upon market demand and can be readily changed from a first desired production capacity to a second desired production capacity to manufacture a desired amount of products from a family of products. The RMS includes a plurality of workstations with reconfigurable machines and computerized numerically controlled (CNC) machines, a control system including a plurality of reconfigurable controllers, as well as a reconfigurable material handling system. The reconfigurable machines may be reconfigurable machine tools having reconfigurable hardware that enables conversion of the machines by, for example, relocating their spindle units. The RMS production capacity is quickly adjusted to market fluctuations in product demand. The RMS functionality is easily adapted to fabrication of new products of the same product family. The RMS possesses certain key characteristics (i.e., modularity, integrability, customization, convertability, and diagnosability) that are needed for rapid and cost-effective reconfiguration. A methodology for the design of an RMS, and a complementary methodology for changing the production capacity including reconfiguration and ramp-up of the RMS are also provided.

30 Claims, 12 Drawing Sheets

U.S. PATENT DOCUMENTS

| | | |
|---|---|---|
| 5,559,696 A | 9/1996 | Borenstein |
| 5,570,292 A | 10/1996 | Abraham et al. |
| 5,586,021 A * | 12/1996 | Fargher et al. ............. 364/468 |
| 5,691,945 A | 11/1997 | Liou et al. |
| 5,778,386 A * | 7/1998 | Lin et al. .................... 707/200 |
| 5,818,716 A * | 10/1998 | Chin et al. .................. 364/468 |
| 5,844,804 A * | 12/1998 | Schussler .............. 364/474.11 |
| 6,009,407 A * | 12/1999 | Garg ........................... 705/10 |
| 6,138,103 A * | 10/2000 | Cheng et al. .................. 705/7 |
| 6,141,647 A * | 10/2000 | Meijet et al. .................. 705/1 |
| 6,157,915 A * | 12/2000 | Bhaskaran et al. ............ 705/7 |
| 6,198,980 B1 * | 3/2001 | Costanza .................... 700/99 |
| 6,236,901 B1 * | 5/2001 | Goss ........................... 700/95 |

\* cited by examiner

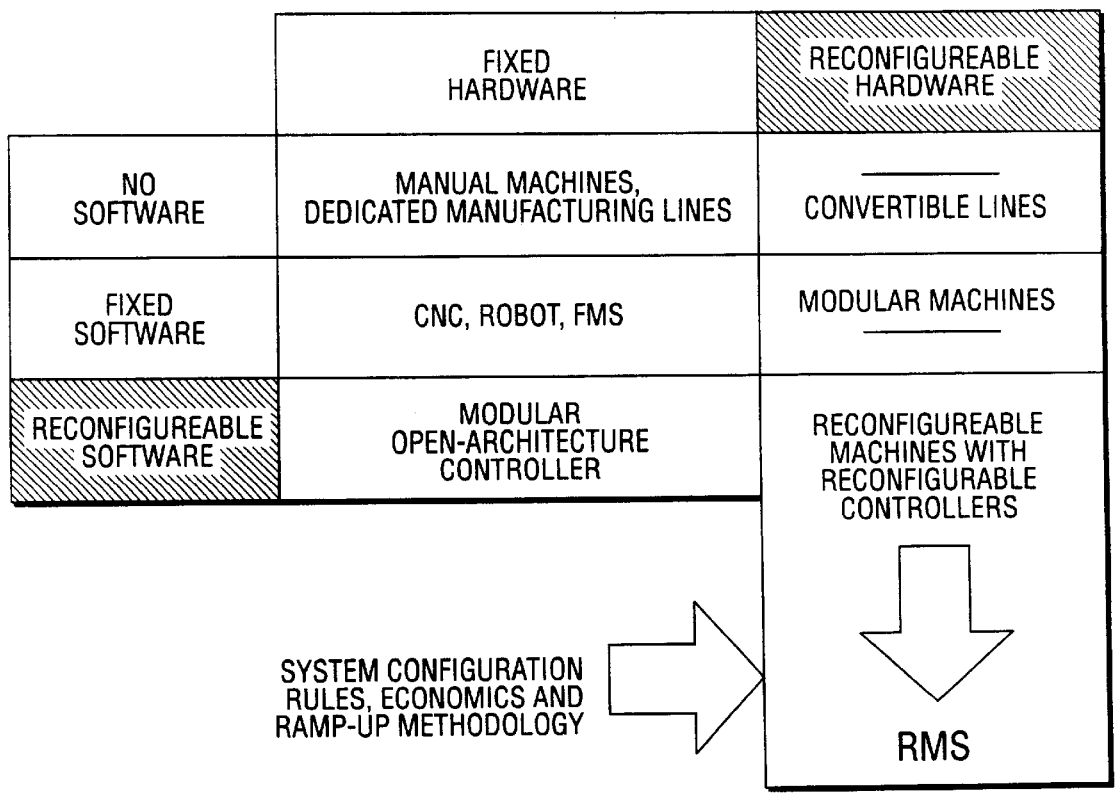

RECONFIGURABLE MANUFACTURING SYSTEM HAVING A PRODUCTION CAPACITY METHOD FOR DESIGNING SAME AND METHOD FOR CHANGING ITS PRODUCTION CAPACITY

CROSS-REFERENCE TO RELATED APPLICATIONS

This application claims the benefit of provisional patent application Serial No. 60/070,959 filed Jan. 9, 1998.

This application is related to and is a continuation-in-part application of U.S. patent application entitled "Reconfigurable Machine Tool" filed Dec. 23, 1997 and having U.S. Ser. No. 08/997,140, now U.S. Pat. No. 5,943,750.

STATEMENT OF GOVERMENT RIGHTS

This invention was at least partially made with Government support under NSF Contract No. EEC 9529125. The Government has certain rights to this invention.

TECHNICAL FIELD

This invention relates to reconfigurable manufacturing system (as illustrated in FIG. 1) and methods for designing and changing the production capacity of same.

BACKGROUND ART

Most medium and high-volume manufacturing industries currently use a portfolio of dedicated manufacturing lines (DML's) and flexible manufacturing systems (FMS's) to produce their products. DML's, or transfer lines, are based on fixed automation and produce the core products of the company at high-volume. These lines are customized hardware lines that can control cutting tools in fixed directions determined at the design stage. They are designed to produce a single product and cannot be changed. Each dedicated line typically produces a single part (e.g., a pump housing). The dedicated lines are economical when large numbers of the same part are to be produced for a period of several years or more.

FMS's produce a variety of products on the same system. They typically consist of computer numerically controlled (CNC) machines, and other programmable automation. CNC machines often use large tool magazines and several axes-of-motion to provide general flexibility which has the potential to produce a variety of parts of different types. But in many cases not all these axes-of-motion are utilized in the production of each part, which means that the machine is underutilized and its initial cost is partially wasted. Typically, the structure of each FMS and the structure of its CNC machines cannot be changed. The production capacity of FMS's is fixed and is usually lower than that of dedicated lines, because their initial cost is higher.

The common denominator for the current two types of manufacturing systems (i.e. dedicated and flexible) is that they use fixed structure and fixed hardware (as illustrated in FIG. 2).

However, medium and high-volume manufacturers are now facing new market conditions characterized by: (i) pressure to quickly introduce new products at low cost, and (ii) large fluctuations in product demand. To cope with these needs and to stay competitive, manufacturing companies must possess a new type of manufacturing system that is very responsive to global markets; a system whose production capacity is adjustable to fluctuations in product demand, and which is designed to be upgradable with new functionality needed to produce new products with tighter product specifications. Current systems, even so-called flexible manufacturing systems, do not have these characteristics.

U.S. Pat. No. 5,691,945 discloses a technique for reconfiguring a high density memory.

U.S. Pat. No. 5,570,292 discloses an integrated method and apparatus for selecting, ordering, and manufacturing art glass panels.

U.S. Pat. No. 5,247,861 discloses a method of manufacturing laminated plastic tooling and tooling produced thereby.

U.S. Pat. No. 4,816,757 discloses a reconfigurable integrated circuit for enhanced testing in a manufacturing environment.

U.S. Pat. No. 4,807,108 discloses a product realization method.

U.S. Pat. No. 4,783,782 discloses a manufacturing test data storage apparatus for a dynamically reconfigurable cellular array processor chip.

U.S. Pat. No. 5,155,679 discloses a set-up optimization method of flexible manufacturing systems.

U.S. Pat. No. 5,456,332 discloses a multiple-degree of freedom vehicle which employs a compliant linkage.

U.S. Pat. No. 5,559,696 discloses a mobile robot internal position error correction system.

Other related publications include:

Goldman, S., Nagel, R. and K. Preiss, 1995, AGILE COMPETITORS AND VIRTUAL ORGANIZATIONS, 1995;

Hu, S. J., 1997, "Stream of Variation Theory and Its Application to Body Assembly", CIRP ANNALS, 1997;

Koren, Y, Pasek, Z. J., Ulsoy, A. G. and U. Benchetrit, "Real-Time Open Control Architectures and System Performance", ANNALS OF THE CIRP, Vol. 45, No. 1, 1996; and Villasenor, J. and W. H. Mangione-Smith, 1997, "Configurable Computing", SCIENTIFIC AMERICAN, June 1997.

SUMMARY OF THE INVENTION

An object of the present invention is to provide a reconfigurable manufacturing system (RMS) including reconfigurable machines, reconfigurable controllers, and a reconfigurable material handling system, as well as methodologies for its systematic design and changing its production capacity including reconfiguration and ramp-up (see FIG. 3).

In general, a reconfigurable manufacturing system (RMS) is one designed at the outset for rapid adjustment of production capacity and functionality, in response to new market circumstances, by basic change of its structure as well as its hardware and software components.

Another object of the present invention is to provide a reconfigurable manufacturing system (RMS) which allows rapid changes in the system structure simultaneously with changes in the structure of machines or apparatus that make up the system. The invention also enables the rapid conversion of the system and its machines from production of one product to another by relocating their basic building modules and having means for their quick and reliable integration. This can be done economically by designing a system to produce parts of the same part-family, or product-family ("product family" means, for example, several types of engine blocks or several types of microprocessors). This enables the quick and economic conversion of the reconfigurable manufacturing system from the production of one part or product to another, where both products are from the same product family.

In carrying out the above objects and other objects of the present invention, a reconfigurable manufacturing system (RMS) having an adjustable structure to quickly change from a first desired production capacity to a second desired production capacity to manufacture a desired mix of products from a family of products is provided. The system includes a plurality of work stations including reconfigurable machines, a control system including a plurality of reconfigurable controllers for controlling the reconfigurable machines, and a reconfigurable material handling system in communication with the control system for transporting material or parts between the work stations. The reconfigurable machines and controllers are modular to permit rapid and reliable integration of the machines and controllers during a change in the structure of the RMS so that the RMS will have the second desired production capacity.

Preferably, the adjustable structure of the RMS also allows the RMS to quickly change from a first functionality to a second functionality (which is typically achieved by adding new features to existing machines of the RMS).

The material handling system may include a plurality of conveyor modules for moving parts or materials between the work stations. Alternatively, the material handling system may include a plurality of wireless-controlled transport vehicles for moving parts or materials between the work stations.

The machines may include reconfigurable machines, CNC machines, modular machine tools, and other machines, at least one of which is capable of performing machining operations.

The controllers typically include modular, open-architecture controls. The machines, the controllers and the material transport system all obey an open standard so that the machines, the controllers and the material transport system can be improved and upgraded rather than replaced.

In one embodiment, at least one of the machines is a CNC machine and at least one of the machines is a machine having reconfigurable hardware components.

At least one of the controllers is a controller having reconfigurable software components or modules. Each of the controllers, the machines and the material transport system has an interface to permit rapid and reliable mechanical and electrical integration with the rest of the RMS.

The family of products has at least one dominant feature and wherein the controllers and the machines are customized to fit the at least one dominant feature. The machines are configured to fit the at least one dominant feature. Each of the controllers includes control modules integrated into an open controller platform.

The RMS also typically includes a communication system for communicating with the machines, the controllers and the material handling system. The RMS further includes a quality measurement system in communication with the communication system for measuring part or product quality after a change in the structure of the RMS. The quality measurement system includes a plurality of sensor modules. Each of the sensor modules is designed and located to provide corresponding sensor information to identify errors or faults.

The work stations may be configured in parallel, in series, or various serial-parallel configurations.

At least one of the machines typically includes a plurality of single axis drive modules.

A controller for the at least one machine is typically a distributed controller having high bandwidth communication.

The RMS typically further includes a reconfigurable system diagnostics network coupled to the controllers and the material handling system to diagnose errors or faults in the RMS.

Further in carrying out the above objects and other objects of the present invention, a computer-implemented method for designing the RMS of claim 1 to have the first desired production capacity is provided. The method includes the step of storing a life cycle economic analysis program in a computer to obtain a programmed computer. The method also includes the step of utilizing the programmed computer to determine whether an RMS is needed based on product information and market forecasts. The method further includes the steps of performing a computer level design for the RMS if the RMS is needed to obtain requirements and performing a machine level design for the RMS based on the requirements to obtain a final design for the RMS.

Preferably, the step of performing the system level design includes the step of designing the RMS to include subsystems that can be readily re-integrated into different RMS configurations.

Also, preferably, the step of performing the machine level design includes the step of designing each subsystem to be modular, integratable, customized, convertable, and diagnosable (see FIGS. 4 and 5).

Still further in carrying out the above objects and other objects of the present invention, a computer-implemented method for changing the production capacity of the RMS of claim 1 is provided. The method includes the steps of monitoring market conditions for the family of products to obtain market information and determining if it is desirable to reconfigure the RMS. If it is desirable to reconfigure the RMS, the method further includes the steps of reconfiguring the RMS at system and machine levels and ramping up the reconfigured RMS to obtain the second desired production capacity.

Preferably, the step of ramping up includes the steps of measuring the reconfigured RMS at the machine level to obtain at least one machine measurement signal, processing the at least one machine measurement signal to obtain a diagnostic signal, and modifying the reconfigured RMS based on the diagnostic signal.

Still preferably, the step of ramping up the reconfigured RMS also includes the steps of operating the reconfigured RMS to obtain a product, measuring the product to obtain a product measurement signal, processing the at least one product measurement signal to obtain a second diagnostic signal, and modifying the reconfigured RMS based on the second diagnostic signal (see FIG. 6).

In recent years, two enabling technologies for RMS have emerged: modular, open-architecture controls that allow reconfiguration of the controller and modular machine tools that allow reconfiguration of the machine hardware. These emerging technologies show that the trend is toward the design of systems with reconfigurable hardware and reconfigurable software with modularity as a key characteristic, as illustrated in FIG. 3. The ultimate goal of RMS is to have machines and systems that are designed to be reconfigurable simultaneously in hardware and software. These reconfigurable manufacturing systems will be open-ended so that they can be improved and upgraded rather than replaced.

They allow flexibility not only in producing a variety of products, but also in changing the system itself.

As shown in FIG. 13 and discussed in the example in a following section, traditional dedicated manufacturing lines have high capacity but limited functionality. They are cost effective as long as the market demands production of large quantities of the same product. But with saturated markets and increasing pressure from global competition, there might be situations where dedicated lines do not operate at full capacity.

Flexible systems, on the other hand, are built with all the flexibility and functionality available, in most cases even with those that are not needed at installation time. The logic behind this is "to buy it, just in case it may one day be needed". However, in these cases, capital lies idle on the shop floor and a major portion of the capital investment is wasted. These two types of waste are dramatically reduced with RMS technology. In the first case, the RMS allows one to add the extra capacity exactly when required, and in the second case to add the additional functionality exactly when needed. Further, when product demand is decreased, the RMS capacity can be reduced and the extra modular components may be reused to augment other lines that have increased product demand.

To allow rapid reconfiguration of lines and machines, reconfigurable manufacturing systems are designed at the outset to be reconfigurable. Otherwise, the reconfiguration process will be lengthy and impractical. Achieving this goal requires that an RMS possesses several key characteristics (as illustrated in FIG. 4). These characteristics are common to many production domains (machining, assembly, semiconductor fabrication, and production of consumer products). These characteristics determine the ease of reconfigurability of manufacturing systems. A system that possesses these key characteristics has a high level of reconfigurability. A system that lacks these key characteristics cannot be cost-effectively reconfigured.

Agility has been defined as "a comprehensive response to the business challenges of profiting from the rapidly changing, continually fragmenting, global markets for high-quality, high-performance, customer-configured goods and services" (Goldman et al. 1995). Agility is, therefore, more of a business philosophy that teaches an organization how to respond to the challenges posed by a business environment dominated by change and uncertainty.

By contrast, reconfigurability is an attribute designed, at the outset, into manufacturing processes and systems to enable them to be agile. Reconfiguration has been discussed in the context of computing systems (Villasenor and Mangione-Smith, 1997; U.S. Pat. Nos. 4,783,782 and 5,691,945) and products. However, reconfigurability is entirely new in the field of manufacturing systems, except for some very specialized applications like glass panel manufacture, as illustrated in U.S. Pat. No. 5,570,292, and laminated plastic tooling manufacture, as shown in U.S. Pat. No. 5,247,861. Reconfigurability in manufacturing encompasses a set of methodologies and techniques that aid in design, diagnostics, and ramp-up of reconfigurable manufacturing systems and machines that give corporations the engineering tools so that they can be agile and respond quickly to market opportunities and changes.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 2 is a table illustrating the state-of-the-art of classes of manufacturing systems;

FIG. 3 is a table illustrating classes of manufacturing systems;

BEST MODE FOR CARRYING OUT THE INVENTION

Figure 1:
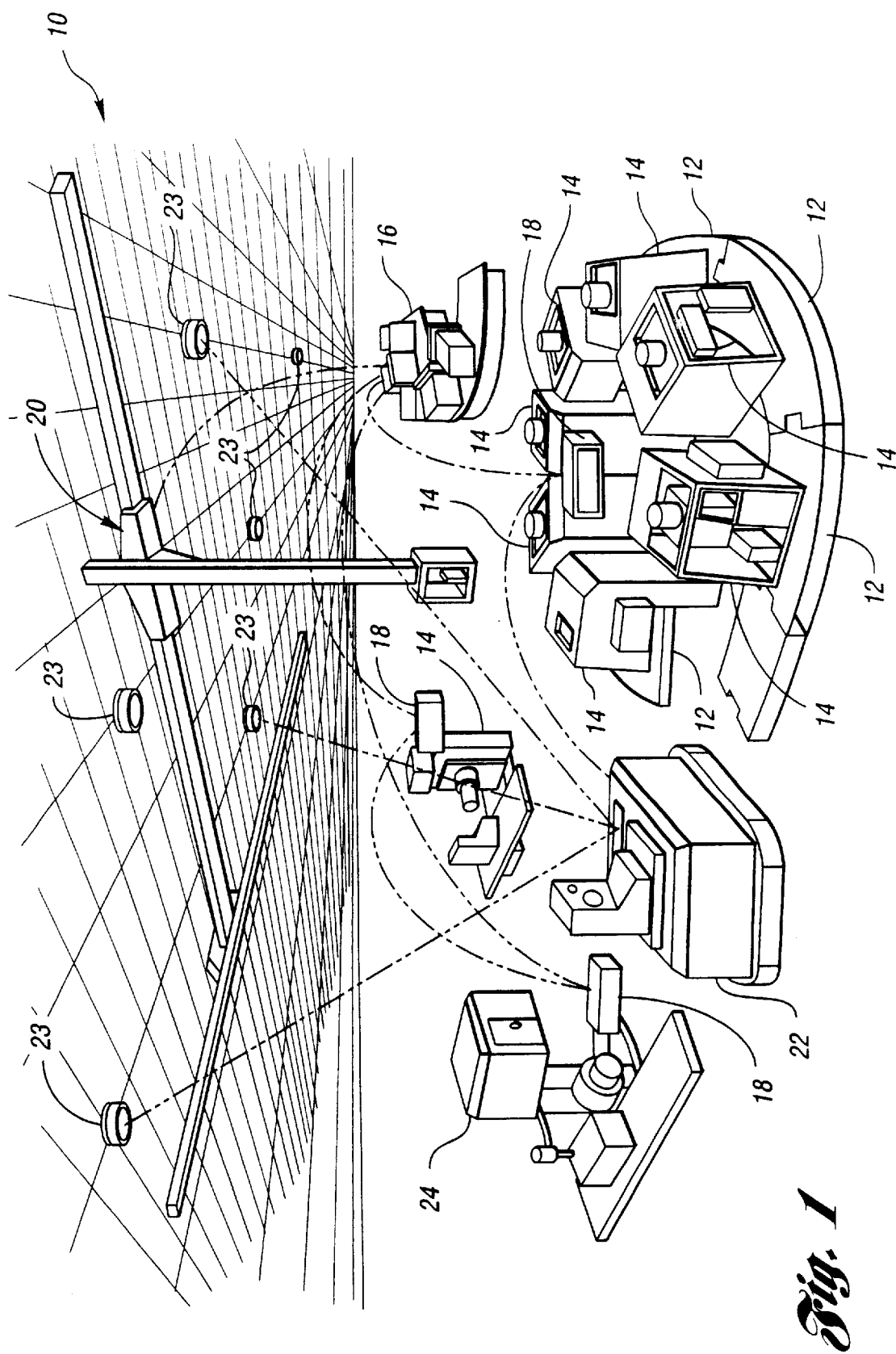
FIG. 1 is a schematic diagram of a reconfigurable manufacturing system (RMS) constructed in accordance with the present invention.

In general, a manufacturing system can be designed to be reconfigurable, and then periodically reconfigured based upon market demand. Such a reconfigurable manufacturing system constructed in accordance with the present invention is generally indicated at 10 in FIG. 1. The system 10 typically includes a plurality of workstations 12 including reconfigurable milling machines 14. The system 10 also includes a control system including an operator station 16 and reconfigurable controllers 18 for controlling the reconfigurable machines 14. The operator station 16 is in communication with the reconfigurable controllers 18 and the reconfigurable controllers 18 are in communication with each other, as indicated by phantom lines therebetween. The system 10 further includes a reconfigurable material handling system including a gantry robot 20, at least one wireless AGV 22, and an array of antenna receivers and transmitters 23 in communication with the AGV 22 as indicated by phantom lines. The AGV 22 is also in communication with at least one of the reconfigurable controllers 18 as also indicated by a phantom line.

The RMS 10 allows the integration of new production technology such as a laser machining system 24 which has its own reconfigurable controller 18 which is in communication with the operator station 16 and one of the other reconfigurable controllers 18 as also indicated by phantom lines.

Figure 5:
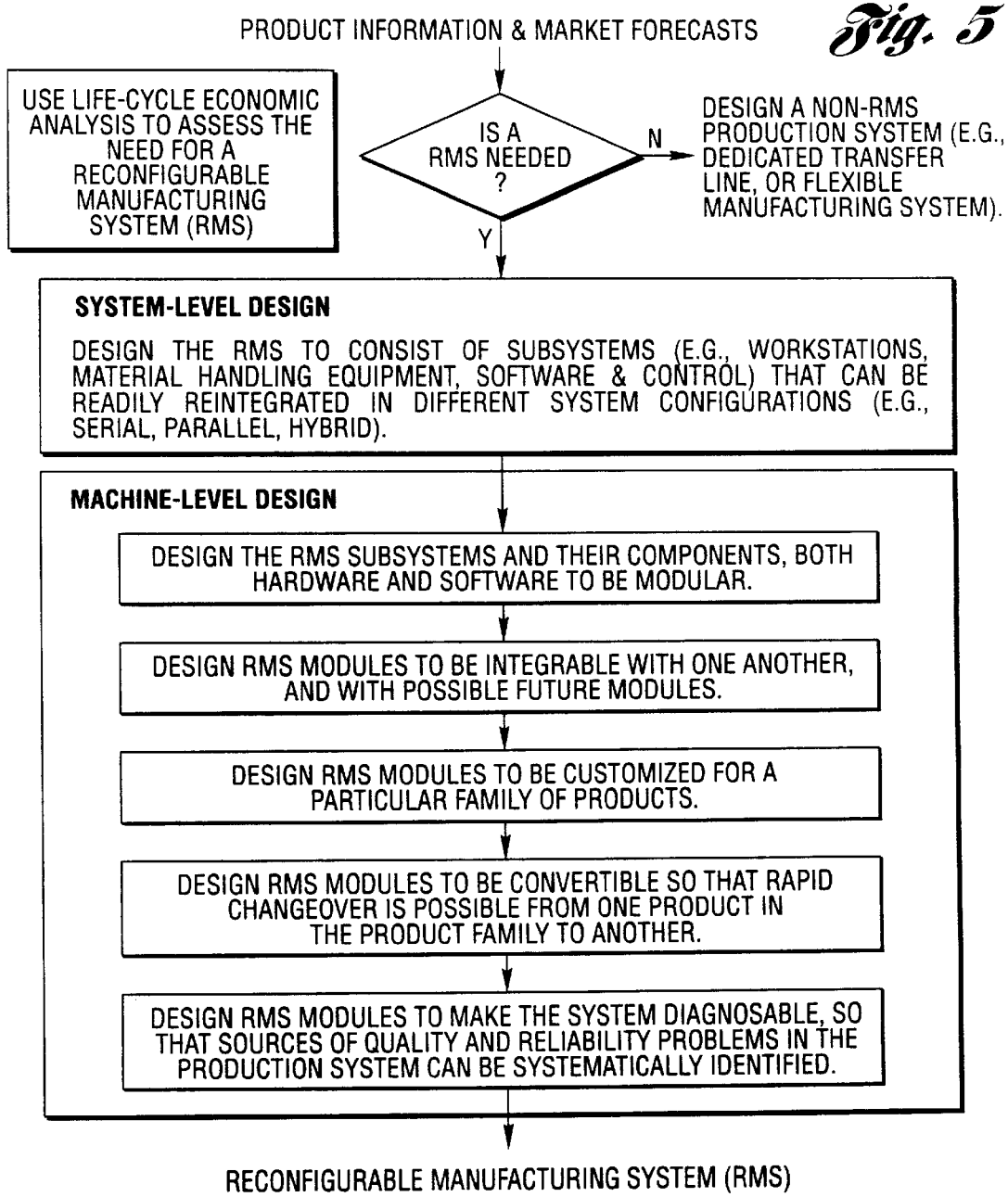
FIG. 5 is a block diagram flow chart illustrating methodology for design of a reconfigurable manufacturing system.
Figure 6:
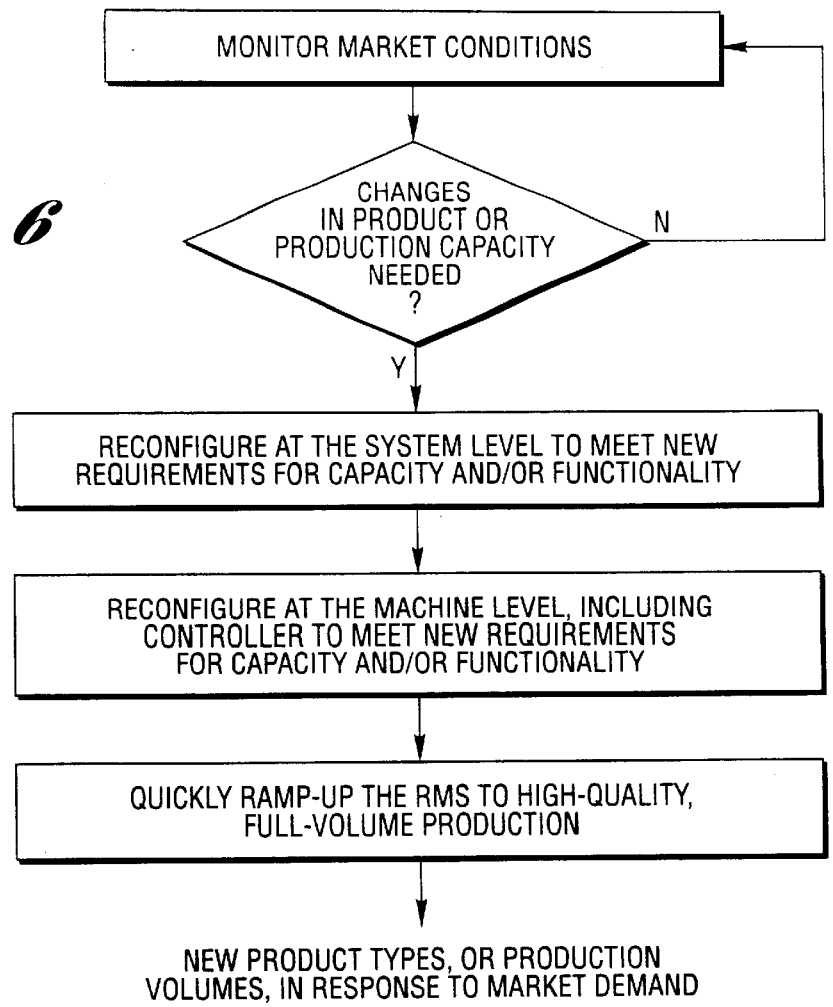
FIG. 6 is a block diagram flow chart illustrating a methodology for operation, including reconfiguration and ramp-up, of a reconfigurable manufacturing system.

The invention also consists of two related methodologies. The first is a methodology for the design of the reconfigurable manufacturing system (RMS) 10 which design methodology is shown in FIG. 5, and the second is a methodology for the operation, including reconfiguration and ramp-up, of the RMS 10 which operation (i.e., reconfiguration) methodology is shown in FIG. 6.

Design of RMS

Figure 4:
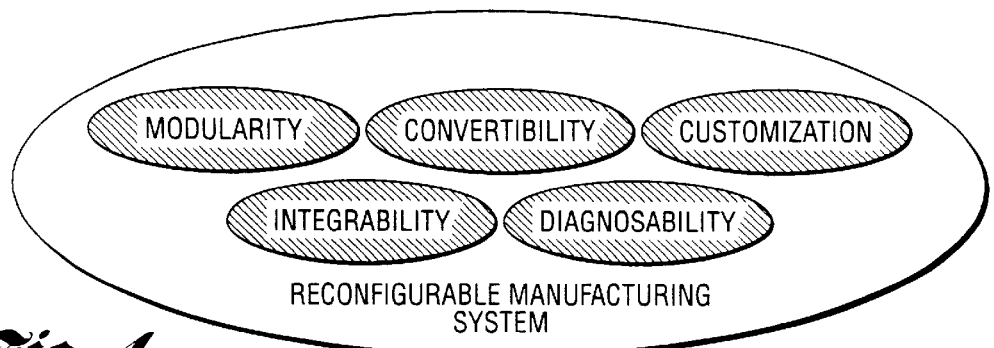
FIG. 4 is a diagram illustrating the design of reconfigurable manufacturing systems utilizing scientific knowledge to achieve certain key characteristics.

A manufacturing system consists of various subsystems, such as the workstations that carry out the manufacturing operations, the material handling system, and the communications and control system. For a system to be reconfigurable, these subsystems and their components must be designed to be reconfigurable at the outset. In order for a system to be reconfigurable, it must consist of subsystems and components that have been designed at the outset, using scientific knowledge, in order to possess certain key characteristics (see FIG. 4).

Key Characteristics of Reconfigurable Systems

Reconfigurable manufacturing systems must be designed at the outset to be reconfigurable. Otherwise, the reconfiguration process will be lengthy and impractical. Achieving this goal requires that an RMS possesses several key characteristics:

Modularity: In a reconfigurable manufacturing system, all major components are modular (e.g., structural elements, axes, controls, software, and tooling; see examples in FIGS. 16–21). When necessary, the components can be replaced or upgraded to better suit new functionality and new applications. With a modular structure, new compensation and calibration algorithms can be readily integrated into the machine controller, resulting in faster ramp-up times. Selection of basic modules, and their synthesis methodologies, allow creation of systems that can be easily integrated, converted, diagnosed, and customized.

Integrability: A set of system configuration and integration rules and methodologies is used to aid in designing reconfigurable systems. In addition, the machine controls and the processing units are designed for integration into a system. Each module of an RMS possesses a means for integration (e.g. appropriate interfaces for mechanical and electrical integration to provide for exchange of information and transmission of power).

Customization: To reduce system cost, the machine and controller configuration must be customized to fit the dominant features of a part family and the application by utilizing the concepts of customized flexibility and customized control. Customized flexibility means that the dominant features of the part family being manufactured will determine the machine configuration. Eliminating unnecessary axes of motion, for example, will increase reliability and reduce cost without compromising flexibility. Control customization is achieved by integrating control modules (e.g. user-developed process models, special compensation algorithms, diagnostics that match the system type, and customized process-management strategies) into generic controller platforms. The benefits of such customization are improved speed, accuracy, uptime, and machine life.

Convertibility: System conversion from one product to another, accompanied by setup, needs to be carried out quickly to be effective. To achieve this, RMS contains advanced mechanisms and controls that allow easy reconfiguration and conversion, as well as sensing and control methods that enable ease of calibration of the machines after conversion and reconfiguration.

Diagnosability: As production systems are made more reconfigurable, and their layouts are modified more frequently, it becomes important to rapidly tune the newly reconfigured system so that it produces quality parts. Consequently, reconfigurable systems are designed with product quality measurement systems as an integral part. These measurement systems help to rapidly identify the sources of product quality problems in the production system and to correct them by utilizing modern information technologies, statistics, and signal processing techniques.

These characteristics determine the ease of reconfigurability of manufacturing systems. A system that possesses these key characteristics has a high level of reconfigurability. A system that lacks these key characteristics cannot be readily and cost-effectively reconfigured.

FIG. 5 shows the design methodology to be employed for design of reconfigurable manufacturing systems (RMS). Note that RMS is not the best solution for every production environment. A life-cycle economic analysis is needed to determine whether the production system should be dedicated, flexible, or reconfigurable. The RMS is to consist of reconfigurable subsystems and components. For a typical manufacturing system these include the reconfigurable workstations (machines, equipment, processes, and tooling) that perform the manufacturing operations, as well as all the auxiliary systems such as material handling, control and communications. The first step in the RMS design methodology is system-level design, where the overall system must be designed so that its subsystems can be quickly and cost-effectively rearranged in different system configurations (e.g., serial, parallel, hybrid). Then the machine-level design addresses the design of the subsystems and components of the RMS such that each will have the key characteristics noted above. That is, they must be modular, integrable, customized, convertible, and diagnosable.

System-Level Design

Design of reconfigurable systems is accomplished through a systematic approach, supported by software tools, that relates the product features to modules of processing units and yields a system layout and process plans. Experience plays a key role in carrying out these steps today.

Figure 7:
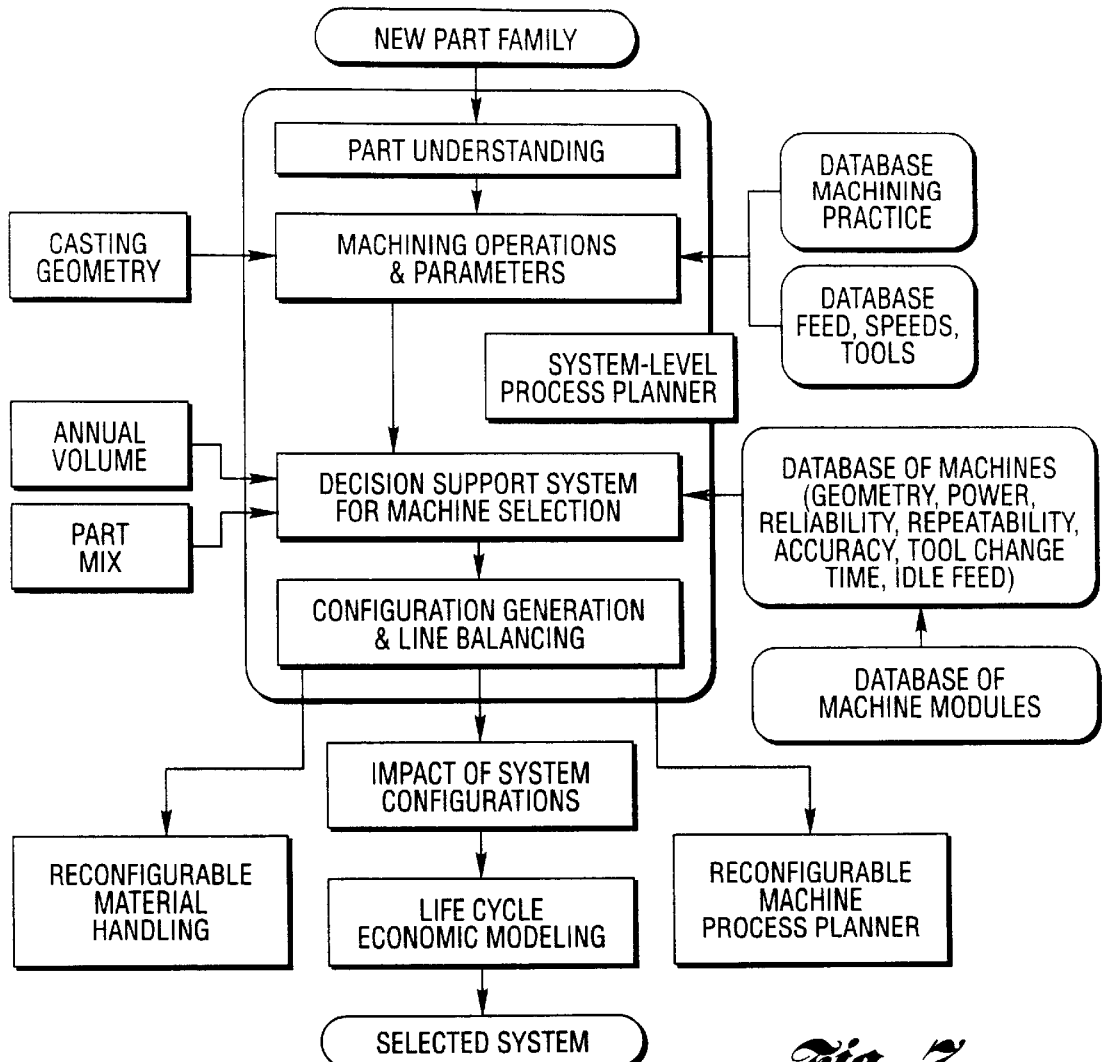
FIG. 7 is a block diagram flow chart illustrating system level design methodology for reconfigurable manufacturing systems.

The steps required to achieve rapid "system-level design and build" of a new or reconfigured manufacturing system are summarized in FIG. 7. The steps in FIG. 7 correspond to the system-level design block in FIG. 5, and are not decoupled; the results must be refined through iteration. First, machine selection requires one to go from user requirements (e.g. product features and annual volumes and product mix), through selection of processing operations (e.g. drilling, milling, turning, grinding) to a set of reconfigurable machines and tools that perform these operations. This transformation from part geometry and tolerances to the selection of reconfigurable machines is a key step.

Another important decision in this process is the selection of the system configuration. The arrangement of the processing-units in series, in parallel, or in different hybrid configurations, has a profound effect on factors such as product quality variations, overall system productivity, the ease of adding incremental production capacity, overall system reliability, and cost.

Figure 8:
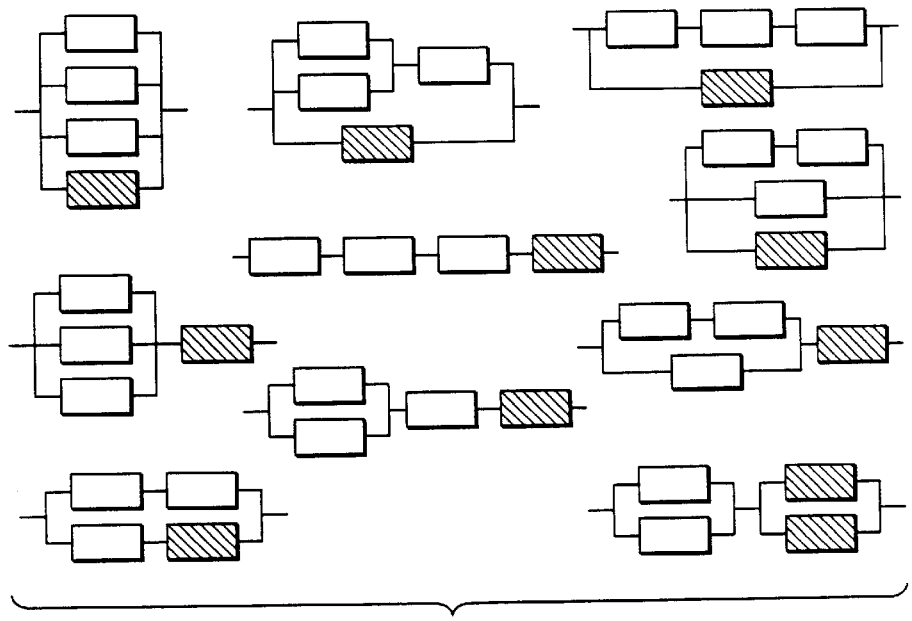
FIG. 8 illustrates ten possible system configurations with four machines.

Selecting the optimal solution from the large number of possible alternatives (more than $2^{n-1}$ for n machines, e.g. 10 for 4 machines, see FIG. 8) is accomplished through the use of configuration rules. The large number of alternative configurations can be reduced to a smaller feasible set, for example, based upon the characteristics of the product family to be produced (i.e. customization).

Next, the required operations are distributed across the machines in a balanced manner.

Finally, life-cycle economic modeling that estimates the system cost during its entire life-time, and accounts for future product changes and uncertainty in market conditions, is used to select among the feasible manufacturing system alternatives. The material handling system, in addition to the processing units, is also designed to be reconfigurable (e.g. modular conveyors, autonomous AGV's).

Machine-Level Design

Figure 9:
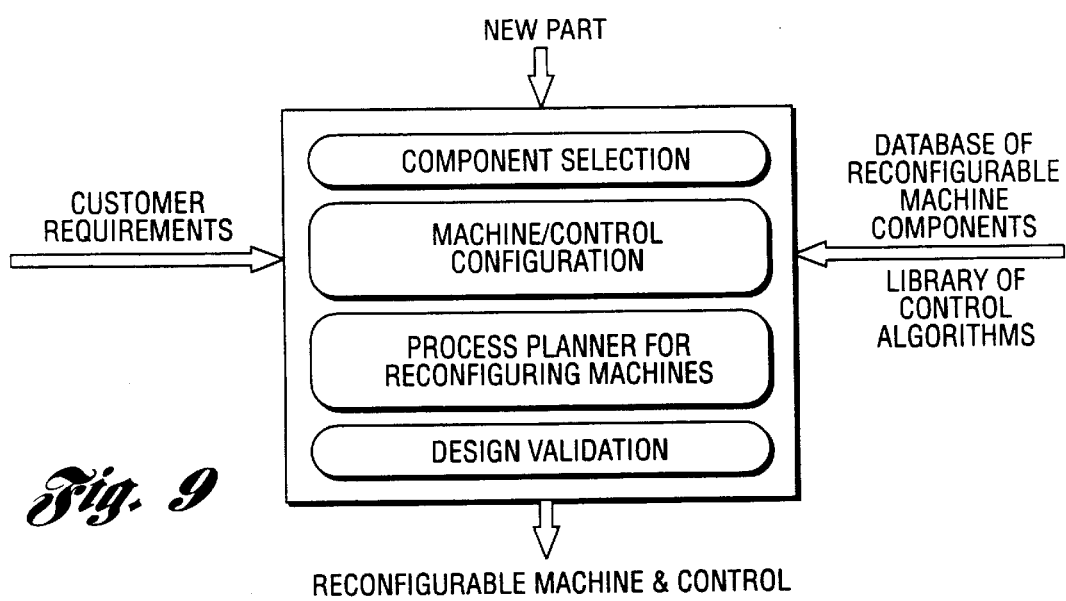
FIG. 9 is a block diagram flow chart illustrating a machine level design methodology for reconfigurable workstations or machine tools.

Reconfigurable manufacturing systems, as shown schematically in FIG. 5, require design at both the system and machine control levels. The required design steps at the machine level are shown in FIG. 9. As described previously, the design must be modular, integrable, customized, convertible, and diagnosable to support cost-effective reconfiguration and ramp-up. Modular machine component design, and an open-architecture controller are key enabling technologies (see FIG. 3). However, they are not sufficient, and methods for the rapid reuse of such modules and the design of these modules for reconfiguration are also important for reconfigurability.

Machine components (e.g. structural modules, axis drive modules) and controller components (e.g. servo control algorithms, thermal compensation algorithms) must be cataloged and stored for reuse, and new modules added to the catalog as they are created. Furthermore, these modules must be configured into one or more feasible candidate configurations. Process planning software for reconfigurable machines is used to plan the processing operations (e.g. sequence of cuts, their depths, feeds and speeds). Then an optimal design, based upon the system level specifications, is selected from among the feasible candidate designs generated by the RMS machine-level design software.

Operation, Reconfiguration Modes and Ramp-Up of an RMS

Once a manufacturing system is designed to be reconfigurable, as described in the previous section, it is then ready to be effectively reconfigured, when needed, in response to changing market demands as illustrated in FIG. 6. Consequently, it is necessary to carefully monitor market conditions for the product being produced on the RMS, as well as for other existing or potential products in the same product family. Based upon these evaluations, it is necessary to decide if changes to the current production system are needed in terms of product type (within the part family), or in terms of production capacity. If changes are needed, then the RMS must be reconfigured in terms of either capacity, or product type, or both. This requires means for system-level reconfiguration, machine-level reconfiguration, and ramp-up (see FIG. 6).

The possible drivers for reconfiguration, and the resulting reconfiguration modes, are summarized in Table 1 below. As can be seen from the fourth row of Table 1, one of the reconfiguration modes is the integration of new process technology. The ease of process integration into existing systems is important, as explained in the example below.

For example, some 25 years ago, drivers had to add engine oil every 1000 miles. Today, such a need does not exist. This improvement is attributed to process technology—the ability to machine parts at higher precision. One of the major reasons that it took so long to implement this improvement is that the traditional machining lines for engines are non-upgradable, closed systems with a life time of 20 years. Drivers had to wait for the construction of new machining systems that utilize the new process technology and are able to produce the new engine technology. By contrast, RMS technology would allow rapid implementation of such a product improvement by the integration of the needed process technology into existing reconfigurable systems.

TABLE 1

| Driver for Reconfiguration | Reconfiguration Mode |
|---|---|
| New Product (new system) | Design of a New Reconfigurable System |
| Changing Product Demand (existing products on existing system) | Change Incremental Production Capacity |
| Add New Product (original product is phasing out; new product is ramping-up; both produced on existing system) | Add or Change Functionality |
| Improved Quality or Productivity Requirements | Integrate New Process Technology into Existing System |
| New Product Family (discard existing product family; reuse existing system components) | Integrate Reusable Existing Modules with New Modules |

System and Machine Level Reconfiguration

The same methodology, and computer-aided-design (CAD) software, for design of reconfigurable manufacturing systems that was described in the previous section, and in FIGS. 7 and 9, can be used for reconfiguration of RMS. When a new product in the same family is introduced, or the market demands changes in production capacity for an existing product, the system must be reconfigured to accommodate these changes. First a system-level redesign of the RMS is undertaken, following the same approach described in FIG. 7. Those system level changes, in turn, will then necessitate machine-level design changes which are made as described in FIG. 9. In other words, the system and machine level re-design methods associated with the reconfiguration of the RMS are the same as the design methods originally used to design the RMS. The methodology and CAD software developed for RMS design can then be used during both the initial design and reconfiguration phases.

Ramp-Up

After the RMS is reconfigured, the production system must typically be "fine-tuned" before it can consistently produce at the required quality and production volume. This is referred to as ramp-up, and can take months or even years with traditional production systems. For RMS to be practical, it is necessary to significantly reduce ramp-up times for both new and reconfigured systems. This objective of ramp-up time reduction in reconfiguration of RMS requires diagnostics, calibration, and ramp-up methodologies, again at both the system and machine levels. The basic engineering methodology required is summarized in FIG. 10. The measurement step requires the selection of type and configuration of sensor modules (e.g. part dimensions, axis position, cutting force). The diagnostics step utilizes that sensor information to identify errors and faults (e.g. machine or fixture geometric errors, tool breakage). Diagnostics should be embedded at the component level, and propagate the information through the machine level, to the cell and factory computers. The measurement system and the diagnostic methodology should allow for machine/system diagnosability—identifying a sole source for a fault or a part quality problem. The compensation step, either automatically or through operator intervention, enables corrective action to be taken (e.g. calibration, adjustment of operating parameters, maintenance).

Description of the RMS

An Example of Reconfiguration and its Benefits

The following example illustrates the dynamics of an RMS. The drivers for reconfiguration and various reconfiguration modes, as introduced in Table 1, are illustrated. The economic benefits that can be achieved due to reconfiguration are also described.

A Reconfiguration Scenario

We will go through an 8 year production scenario, illustrated in FIGS. 11a–c and 12a–b, and describe the reconfiguration drivers and modes presented previously in Table 1.

1. Driver: New Product

Mode: Design of a New Reconfigurable System

Assume that the projected annual volume of product A is between 300,000 to 400,000 units. Traditionally, a dedicated manufacturing line (DML) with capacity of 400,000 units is designed and built. Alternatively, an FMS (which is more expensive than the DML) with capacity of 300,000 may be built. With the RMS methodology, a system with reconfigurable machines and capacity of 300,000 units is built and starts to operate at Year 0, as shown in FIG. 11b. Unlike FMS, the new RMS for a new product is installed just with the functionality needed for this product, and therefore is less expensive than FMS. The RMS design enables the upgrading of the system functionality when an additional new product is introduced.

2. Driver: Changing Product Demand

Mode: Change Incremental Production Capacity on Existing System

The actual demand does not exceed the planned capacity for two years. Toward the third year, demand starts to accelerate. The RMS capacity is quickly upgraded by 33% (from 6 to 8 machines) to supply the additional demand. To enhance reliability, the system configuration is changed to two parallel lines both producing product A. However, at the 5th year, the unexpected happens—demand starts to decrease and the system capacity becomes underutilized.

3. Driver: Add New Product

Mode: Add Functionality

The company realized that the original product A is phasing out, and introduced a new product (i.e. product B) of the same part-family. The RMS in Year 6 is changed to accommodate the new situation: Product A is phasing out and product B is ramping-up; both should be produced on the existing system. The functionality of several individual machines in line 2 is upgraded to accommodate the production of product B. The new system is shown in FIG. 11c. Line 1 produces 200,000 units of product A. Line 2 produces both products: 90,000 of A and 100,000 of B.

For 50% of the time, Line 2 produces product B (100,00 units annually), and for 45% of the time it produces product A). It operates as follows. For 4 hours it produces only product B. Then the line is turned off (for 25 minutes) and the machines are converted to produce product A. The machines are designed for quick reconfiguration (e.g. manual adjustment of an angle of a drill, rather than designing a fully controlled tool-tilt motion on a CNC). The next shift starts with production of product A and then the line is stopped and converted; only one conversion per shift is needed.

4. Driver: Changing Product Demand

Mode: Change Incremental Production Capacity on Existing System

The demand for product A remains steady at 250,000, and product B continues to ramp-up (see FIG. 7). The new situation requires adding 12% additional capacity. The new configuration of the system at Year 8 is shown in FIG. 11c.

5. Driver: Improved Quality or Productivity Requirements

Mode: Integrate New Process Technology into Existing System

A troubling problem with FMS is the high risk of an expensive flexible production system becoming obsolete. Because advances in software, computers, information processing, controls, high-speed motors, linear drives and materials sometimes occur in cycles as short as one year, today's most efficient production system can become inefficient, and even obsolete, almost as soon as it goes on-line. This problem is avoided with RMS technology, which enables the integration of advanced components and controls into existing RMSs. In Year 8, a laser station (LS) is also incorporated into the system to improve productivity and quality (see FIG. 12b).

6. Driver: New Product Family

Mode: Integrate Reusable Existing Modules with New Modules

Figure 11A:
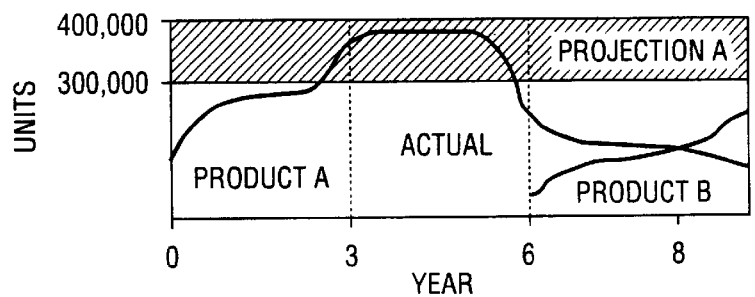
FIG. 11a is a graph and FIGS. 11b and 11c are accompanying system configurations showing the annual volume projection of a product A is between 300,000 to 400,000 units. In the first phase (Year 0), the RMS is built for production of 300,000 units. As market grows (Year 3), the system configuration is changed and it is expanded to produce 400,000 units annually.
Figure 11B:
Figure 11C:
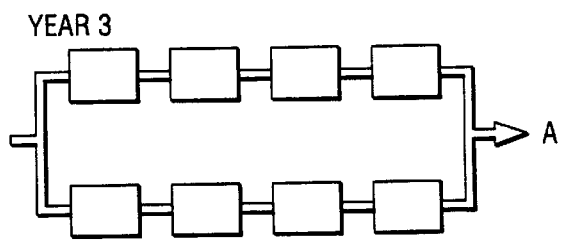
Figure 12A:
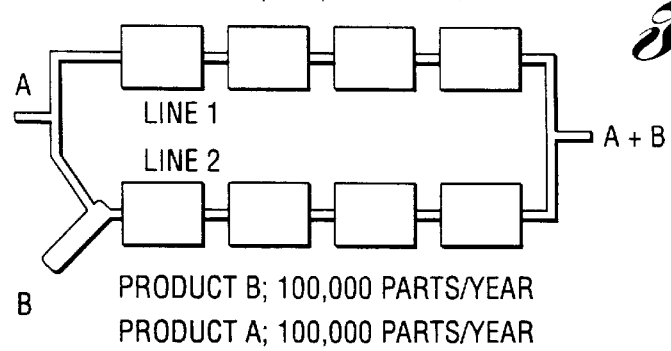
FIGS. 12a and 12b illustrate a pair of system configurations. At Year 6, the actual annual demand for product A decreases to 290,000 units. At the same time, a product B (of the same part family) emerges. The RMS configuration and functionality is quickly adapted to the new market conditions. Capacity is added at Year 8 to respond to the increased market demand for product B, using new laser station (LS)
Figure 12B:
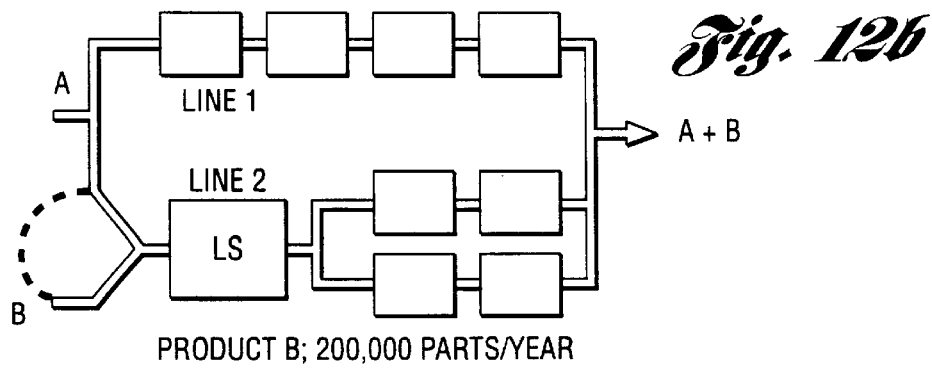

Although not shown in FIG. 11a, eventually the demand for Product B also declines. Sometime after Year 8, the decision is made to no longer produce either Product A or B, or any other products in that same product family. However, some of the machines, because they are reconfigurable, still have considerable value for use in a new production system. This is especially true for some of the new machines (like the LS in FIG. 12b) that were introduced later and are only a few years old. Furthermore, as demand declines these reconfigurable machines can be gradually moved to be used on other production systems; this changeover does not necessarily need to occur after production is completely stopped.

Economic Benefits of the RMS

Figure 13:
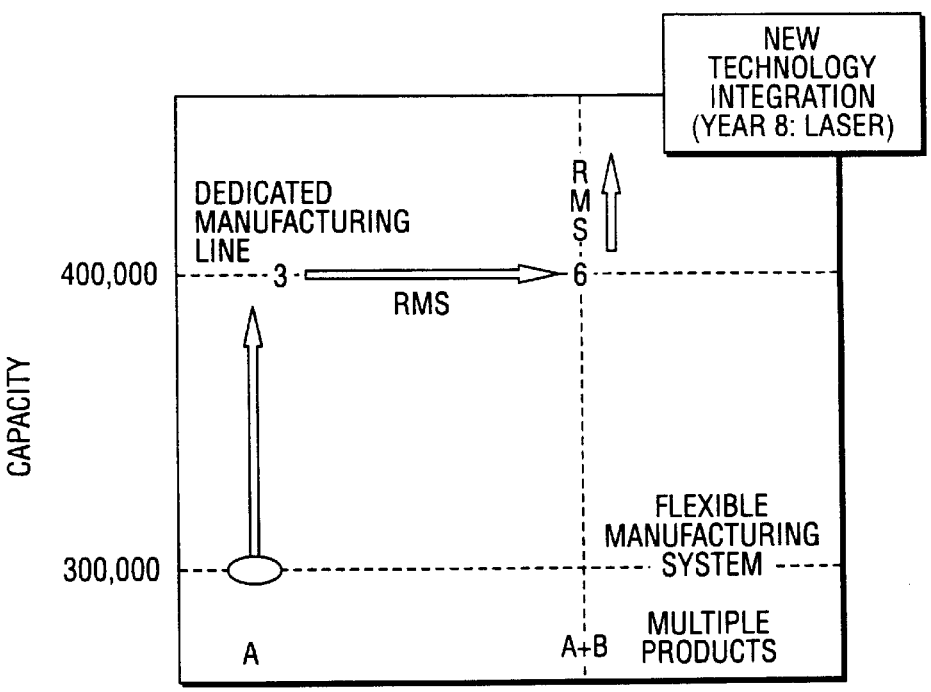
FIG. 13 is a graph illustrating mapping of three types of manufacturing systems in terms of capacity-functionality. The DML is designed to produce quantities to supply the highest projected demand (i.e., 400,000) of a single product A. The FMS could produce many products, perhaps more than will actually need to be produced, and is costly. Consequently, the FMS capacity will typically be based on the lower market projections (i.e., 300,000). The capacity of RMS can be quickly adapted to new market demands, and its functionality can be modified to accommodate new products. The initial capacity of the RMS is designed to supply the lowest projected demand (i.e., 300,000), but it can be quickly adapted to new market demands (Years 3 and 8), and its functionality can be modified/expanded to accommodate new products (Year 6)

FIG. 13 illustrates the dynamics of the RMS in the above described embodiment in terms of capacity and functionality. If we take into account the entire life-cycle cost of a production system, reconfigurable systems are less expensive than flexible manufacturing systems, or even dedicated manufacturing lines. As was illustrated, the RMS allows one to add the extra capacity exactly when required (Years 3 and 8), and to add the additional functionality (i.e., the ability to produce part B as well as part A) exactly when needed—in Year 6. Further, when product demand is decreased, the RMS capacity can be reduced and the extra modular components may be reused to augment other lines that have increased product demand.

An economic benefit of a different type is the enhanced productivity that can be achieved with RMS. If properly designed, RMS will provide the right balance between production speed and general flexibility. That is because RMS is customized for a particular part family. This benefit is elaborated on in the following section, which describes a second preferred embodiment for RMS.

If we take into account the entire life-cycle cost of a production system, reconfigurable systems will not be more expensive than flexible manufacturing systems, or even dedicated manufacturing lines. The main factor that makes the RMS less expensive is that unlike the other types of systems, the RMS is installed with exactly the production capacity and functionality needed, and may be upgraded (in terms of both capacity and functionality) in the future, exactly when needed. Expanded functionality enables the production of more complex parts (or products) and the production of a variety of parts on the same system. It is usually associated with adding process capabilities, auxiliary devices, axis motions, larger tool magazines, more capable controllers, etc.

A Second Example

Consider as a motivating example a situation recently reported in the press, where a major automotive manufacturer could not meet demand on its light trucks, while it had significant idle production capacity for luxury passenger cars. In this situation, profit opportunities in the light truck market were lost, and profits reduced in the luxury car market due to idle capacity. The manufacturer lacked the ability to cost-effectively and rapidly reconfigure the luxury car production line to accommodate light truck production. For this to have been possible, the line would have had to initially been built with a product family in mind that included both types of vehicles.

For example, common reference points would have been established on the two platforms used in body assembly, and the assembly line designed based upon these reference points. Furthermore, spot welding robots (and other equipment on the assembly line) would have been designed and placed to have the range of motion to accommodate both vehicle platforms. The communications and control software developed for the production system would be developed to readily switch from one product to the other. In addition to these design features, the production system would be supported by CAD software tools to enable engineers to rapidly execute the required reconfiguration in response to market demand, and to execute a rapid ramp-up to full-volume, high-quality production after reconfiguration.

When a new production system is installed, or when a production system is reconfigured, it must be fine-tuned to achieve full-volume, high-quality production. This ramp-up process involves measurements of product quality, and subsequent correction of faults in the production system that lead to quality problems. Consequently, for RMS to be feasible, the process of ramp-up following reconfiguration of the RMS must be done quickly and efficiently.

Figure 10:
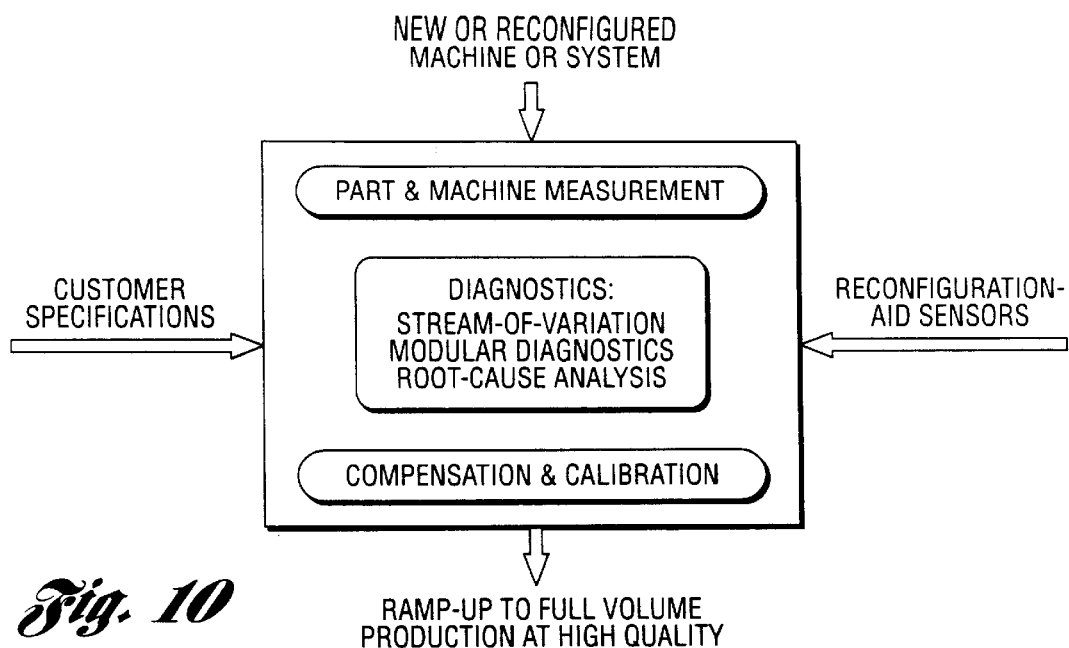
FIG. 10 is a block diagram flow chart illustrating ramp-up methodology for reconfigurable manufacturing systems.

That process is described in FIG. 10, and involves measurement of part quality, diagnostics, and compensation. The measurements must be made in such a way as to make traceable the source of quality problems. This is based upon a methodology termed Stream-of-Variation [Hu 1997]. The Stream-of-Variation methodology not only helps in sensor selection and location, but also enables the analysis of the sensor data to identify the root-cause of the quality problems. The methodology is based upon a combination of statistical analysis and an understanding of the manufacturing process technologies (in particular the sequence of operations being performed). An example, from automotive body production, is given below.

Figure 14:
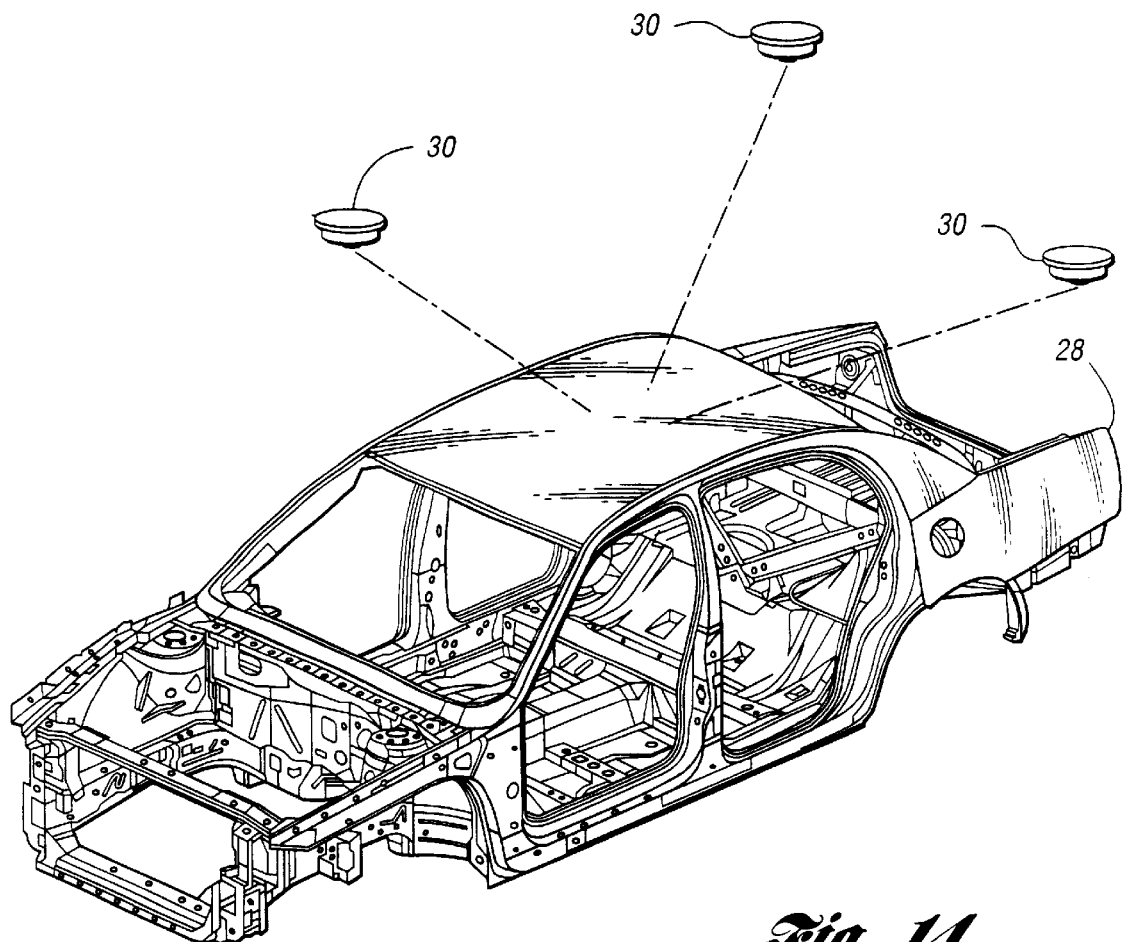
FIG. 14 is a schematic diagram illustrating optical measurement of automotive body dimensions using laser triangulation sensors, strategically located on the assembly line (based upon process knowledge) to achieve detection and isolation of faults.

FIG. 14 shows optical sensors 30 for measuring a vehicle assembly 28 on an automotive body assembly line. These sensors 30, when properly designed and located, can help diagnose problems on the assembly line (e.g., broken locator, incorrectly programmed robot) that can lead to consumer problems such as wind noise, water leakage, etc.

Figure 15:
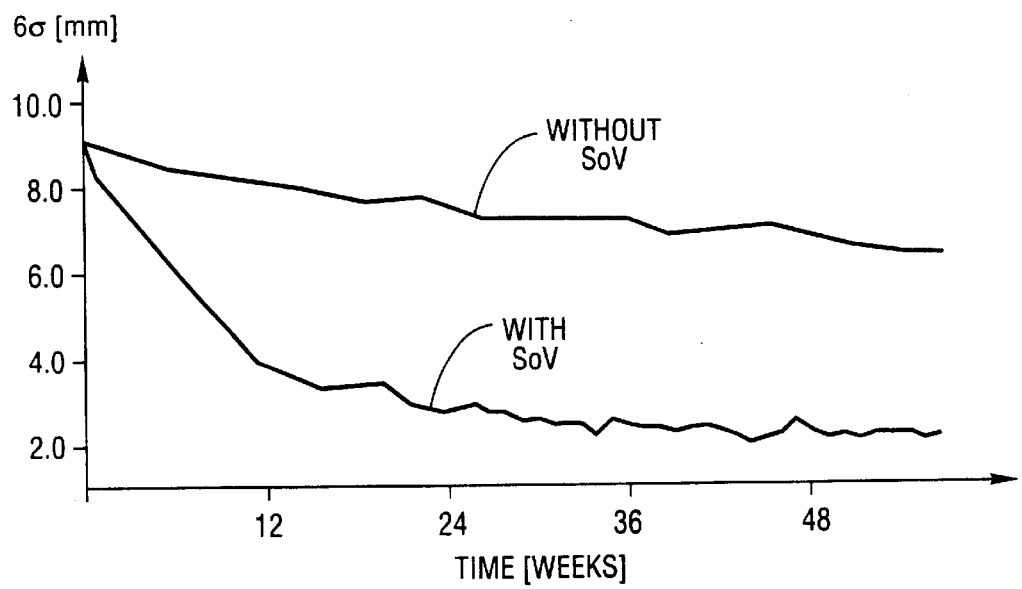
FIG. 15 is a graph of results showing ramp-up time reduction in automotive assembly.

FIG. 15 shows, with results from actual production, the benefits that can be achieved in terms of rapid reduction of the variation ($6\sigma$) in critical body dimensions by applying the methodology depicted in FIG. 10 with the Stream-of-Variations (SoV) theory. Note that both the reduction in variation is rapid, and the final level of variation is low.

Machine-Level Design for Reconfigurability

An RMS system can be designed with reconfigurable workstations that use single-axis drive modules as the basic building blocks. This would represent an evolution of RMS from dedicated manufacturing lines (DML), and require modular machine components and distributed controllers with high-bandwidth communication. Dedicated lines are customized hardware lines built with precisely the functionality needed to produce a specific product. Therefore, they can take advantage of using multiple tools that cut the part simultaneously (typically each group of tools in one direction of motion), thereby achieving high productivity. On the other hand, CNC machines, which are the cornerstones of FMS, are designed as multi-axes, general purpose machines that use a single tool that can be manipulated in different directions to allow for general flexibility. However, not all these axes of motion are needed in the production of each part.

Figure 16A:
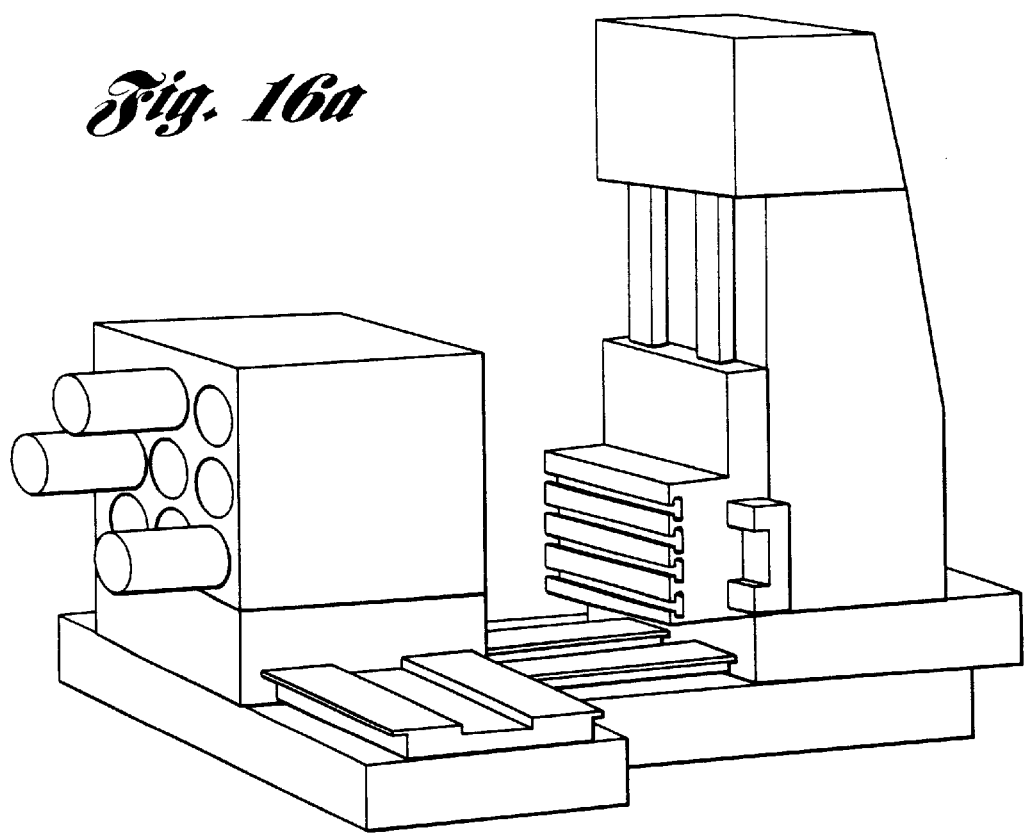
FIGS. 16a and 16b are schematic perspective views illustrating an RMS machine with a CNC base. Reconfiguration requires changing the customized tool modules.
Figure 16B:
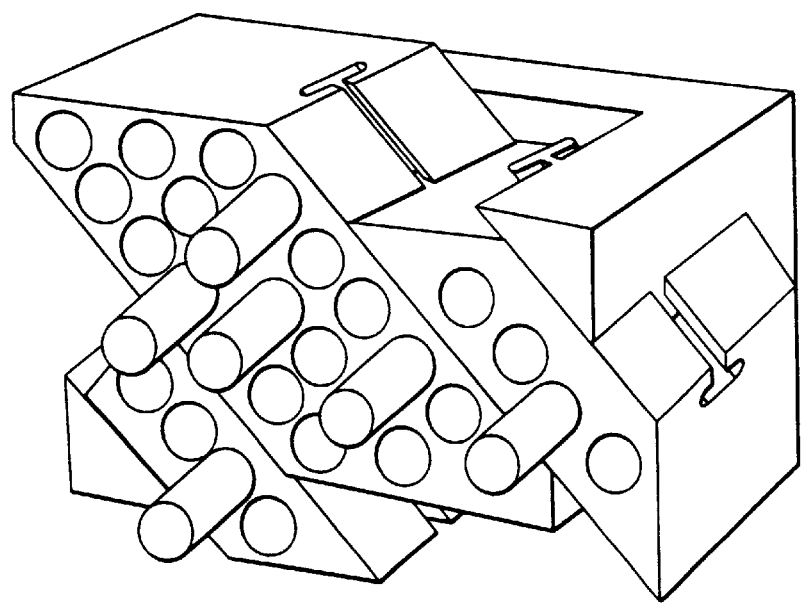

A key characteristic of RMS machines is that by being modular they might be designed with smaller number of active axes-of-motion the provides all the flexibility needed to produce a part family. We call this characteristic customized flexibility. This characteristic also allows the use of several tools that cut simultaneously, thereby increasing the productivity to the level achieved by DMLs. This concept combines active degrees-of-freedom (driven by motors) with passive degrees-of-freedom (manually reconfigured) to achieve the customized flexibility. FIG. 16a illustrates the concept with a basic machine base that can have a variety of tool spindle modules (each spindle module is separately controlled), with a rapid change tooling block design. Such reconfigurable machine tools combine the high-productivity achieved with multi-tool operation with the programmability of a CNC. This reconfigurable machine example consists of a CNC base and a customized tooling unit as shown in FIG. 16b. The tools in the tooling unit may also be arranged at different angles to machine special features. The reconfiguration from product A to product B requires a change of the tooling units on the machines.

The advantage of the said reconfigurable manufacturing system is that it permits easy reconfiguration of the structure of the system and easy reconfiguration of the structure of the machine, and its spindle-units, to produce economically a new series of parts of the same part family. This also allows one to produce on the same basic machine a variety of part geometries with a small number of controlled axes-of-motion. It also permits reduction in the cost of the machine since it does not have axes-of-motion that are not utilized for the machining of a particular part series. The reconfigurable machine rather combines active degrees-of-freedom (driven by motors) with passive degrees-of-freedom (manually reconfigured) to achieve customized flexibility.

Another advantage of the reconfigurable machine is the possibility of using several tools such that their motion is simultaneously controlled by a computer, thereby combining advantages of DMLs and CNCs. Dedicated lines can take advantage of using multiple tools that cut the part simultaneously (typically, each group of tools in one direction of motion), thereby achieving high productivity. On the other hand, CNC machines use a single tool that can be manipulated in different directions. By contrast, the reconfigurable machine allows the use of several tools that cut simultaneously, thereby increasing the productivity to the level achieved by DMLs, and the motions of each tool are programmable, thereby achieving the advantage of CNC. The enhanced productivity achieved with the reconfigurable machine is an important economic benefit. The reconfigurable machine provides the economic balance between production speed of DML and general flexibility of CNC.

The design of a reconfigurable machine for a part family should include the conversion of geometric features of all parts of the family to machining operations, specifying tool orientations and the tool path, and reconfiguring a machine (from a library of modules) to match the tool motions effectively. Each part can be produced with a certain machine configuration where several axes may cut simultaneously. The conversion from one part to another is done by adjusting passive degrees-of-freedom, as explained in the example below.

Figure 17A:
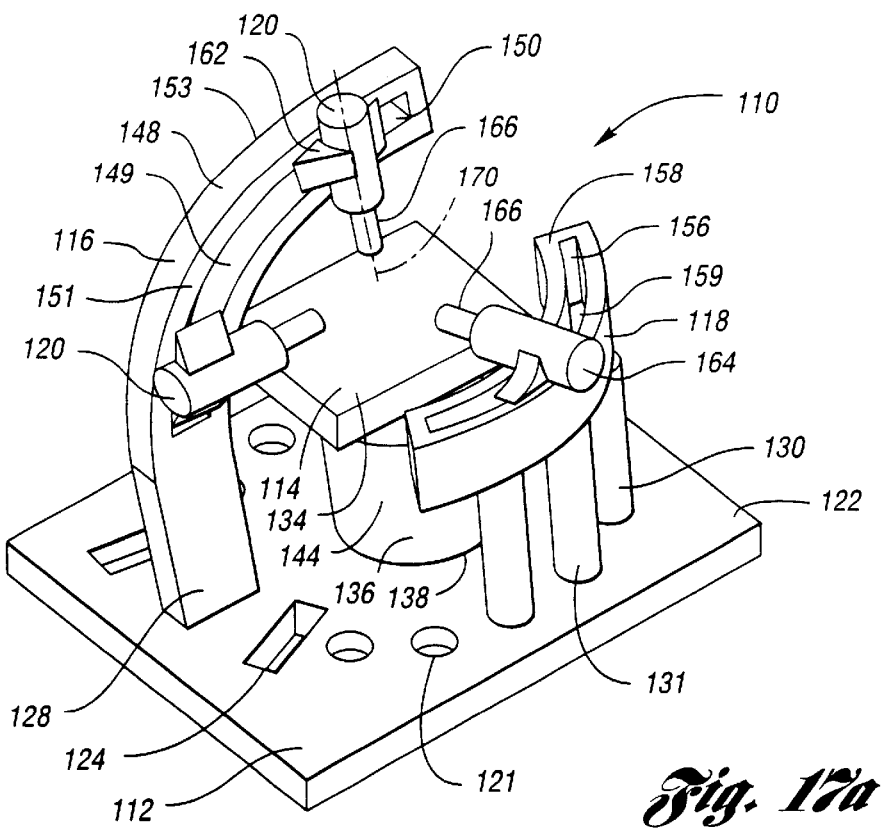
FIGS. 17a and 17b are schematic perspective views illustrating two configurations of a reconfigurable machine tool. Single-axis drive modules are basic building blocks. Clearly the mechanical design (e.g. stiffness of column and accuracy of locator holes) would need to be improved on the actual machine tool.
Figure 17B:
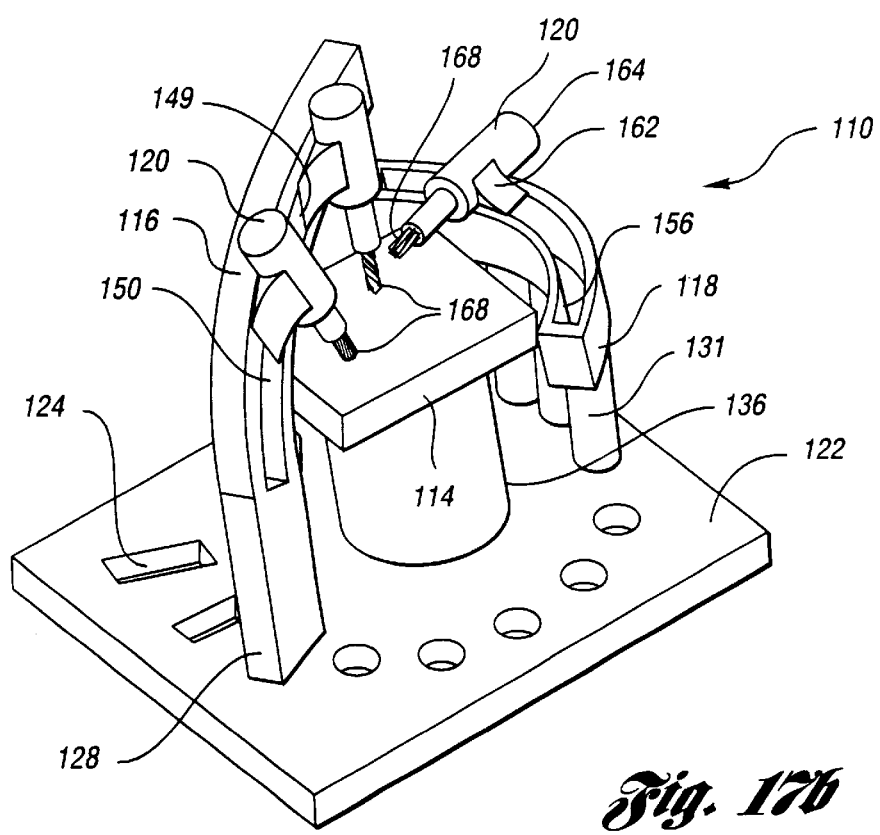

For example, consider the conceptual reconfigurable machine depicted in FIGS. 17a and 17b, where several cutting tools are attached to spindles and operate simultaneously on the part. FIGS. 17a and 17b show a conceptual example. Clearly the mechanical design (e.g., stiffness of column and accuracy of locator holes) must fit the part tolerances. The scientific challenge is to extract the key geometric features of several parts from a part family and to design a reconfigurable machine that can produce these parts. The concept of design for a part family is the essence in designing a reconfigurable system. If a capability to machine any arbitrary part is required, then FMS rather than RMS is the desired solution.

Referring now in detail to FIGS. 17a and 17b, there is shown in FIG. 17a a machine tool assembly, shown generally at 110. The preferred embodiment of the machine tool assembly 110 includes a base 112, a table 114, two support units 116 and 118, and at least one spindle unit 120. When assembled and operated, many of the components may be set or moved relative the base 112 to provide multiple degrees of freedom in which the spindle units can move relative a workpiece or raw part (not shown) that is to be machined. These manual reconfigurations are made and set prior to operation of the assembly, thereby adding passive degrees of freedom to the assembly, while other movements may be driven by motors (not shown) during operation, thereby adding active degrees of freedom. The end result is an assembly 110 that combines these degrees of freedom to achieve customized flexibility for each process to be performed.

The base 112 of the machine tool assembly 110 has a generally flat upper surface 122, and includes several rectangular locator slots 124 and circular locator apertures 126 positioned in a generally circular orientation around the base 112. The shape of the location slots 124 and apertures 126 may vary depending on the shape of the corresponding leg portions 128 and 130 of the support units 116 and 118, respectively, as discussed below.

The table 114 generally has a flat top 134, which in one embodiment is mounted atop a column 136. The column 136 is secured to the base 112 at its lower end 138, and is generally centered with respect to the slots 124 and apertures 126 on the base 112. In the embodiment, the table 114 may be movable either horizontally or vertically relative to the column 136, which is accomplished by either sliding the table 114 relative to the column 136 along a track or wheel (not shown) in the bottom of the table 114 or on top of the column 136, or by any other method to accomplish relative horizontal movement, such as an extension on one part sliding along a groove, or inserting an extension on the column into different corresponding apertures in the table.

The column 136 may also be telescopic, or otherwise capable of providing for vertical movement of the table, by allowing an inner portion of the column 136 to slide into an outer portion 144. The desired height of the table 114 may then be mechanically locked. The telescopic column 136 also allows the table 114 to be easily rotated relative the base 112 to provide additional movement of the workpiece.

Furthermore, the table 114 may also be pivotable about a joint (not shown) at the top of the column 136 to allow the table 114 to be angled relative the base 112 for further flexibility in setup of the assembly.

Each of the movements of the table 114 relative to the base 112 may be manually set and secured prior to operation of the assembly, thereby providing additional passive degrees of freedom to the assembly or actuated by linear actuators. Because the table 114 is manually reconfigured prior to operation and is not driven by separate motors, both the assembly and set up costs of the table 114 are greatly reduced. However, it is clearly within the scope of the present invention to include one or more motors that are capable of adjusting the horizontal position, height, rotation, or angle of the table 114 during the machining process, thereby increasing the active degrees of freedom of the system.

In another embodiment (not shown), the table 114 may be allowed to pitch, roll and/or yaw via linear actuators connected in parallel and each attached to the bottom of the table 114 at one end and to the base 112 at the other end. These actuators would be attached to the table 114 and base 112 with joints allowing angular motion, such as ball-and-socket or universal joints, etc.

The preferred embodiment includes two different support units, a vertical or column support unit 116 and a horizontal support unit 118. The column support unit 116 has a vertical leg portion 128 and a curved body portion 148 which includes a curvilinear groove or other guideway 150 located along one or both of its side surfaces 151 and 153. The body portion 148 is curved such that it extends over the table 114 in a semi-circular path 149 along a generally vertical plane. The path 149 is generally centered about the table 114. The leg portion 128 inserts into one of the slots 124 in the base 112 to secure the column support unit 116 thereto. Flexibility is increased by this design because the leg portion 128 may be inserted into different slots 124 to provide a different arcuate path over the table 112, along which one or more spindle units 120, discussed below, may be installed.

To allow further flexibility of the assembly, the leg portion 128 may rotate either around a pivot or shaft (not shown) located in the base 112, which then creates an arcuate path over the table 112 along a non-vertical plane. These additional flexibilities are again additional passive degrees of freedom, as they are manually set prior to operation of the assembly 110.

The horizontal support unit 118 also includes a body portion and a leg portion 130. The body portion is curved and includes a groove or guideway 156 formed along a curvilinear path along its upper surface 158.

The leg portion 130 includes at least one vertical leg 131, which is secured to the lower surface 160 of the body portion and inserted into the locator apertures 126 in the base 112, so that the groove 156 extends in a semi-circular arcuate path 159 which is generally centered about the table 114.

In the preferred embodiment, there are three such legs 131 to prevent rotation of the horizontal support unit 118 and provide additional rigidity to the support unit 118. As with the column support unit 116, the horizontal support unit 118 can also be manually reconfigured by inserting the leg portion 130 into the base 112 into a different set or combination of locator apertures 126, again increasing the passive degrees of freedom for the assembly 110.

The spindle units 120 are attached within the grooves 150 and 156 of the support units 116 and 118, respectively. As shown in FIG. 17a, there are three such spindle units 120. However, there may be more or less than three spindle units 120 depending on the processes the assembly 110 is set up for. The spindle units 120 are secured within their respective grooves 150 and 156 by a locking device 162 that prevents the spindle 120 from moving along the grooves 150 and 156 and further prevents the spindles 120 from dislodging from the grooves 150 and 156 during operation. The grooves 150 and 156 are formed to correspond with the shape of the locking device 162 which allows the locking device 162 to slide along the grooves 150 and 156 and be secured at any point along the semi-circular path formed by the grooves 150 and 156.

Alternately, the support units 118 may have slots extending along their body portions that allow the locking device to extend through the support unit and be secured from the opposite side. The locking device 162 is easy to disengage from the grooves so that the spindle units 120 may be quickly and easily detached from or moved along the grooves 150 and 156 to different locations with respect to the table 114. Additional spindle units 120 may also be easily installed within the grooves 150 and 156. For example, FIG. 17b shows four such spindle units.

Each spindle unit 120 has a motor 164 and a single axis rotating end 166 that is driven by the motor 164. A tool or other means 168 for cutting, drilling, milling or otherwise machining the workpiece is secured to the rotating end 166. These tools 168 are then controlled by the spindle unit 120 and stroke or move linearly along the axis of rotation 170 of the spindle unit 120 while they rotate. Instead of a single tool 168, a modular tool magazine (not shown) may be added to each spindle unit 120. This magazine, which may be a drum, chain, or cartridge with a small number of tools, can be expanded and reconfigured to have the required number of tools and desired positions needed for a specific application.

After a design is completed and the necessary machining processes or series of processes have been developed, the raw workpiece is secured to the table 114 in preparation for the first process. Additionally, the column support unit 116 and the horizontal support unit 118 are inserted into the appropriate locator holes 124 and 126. The appropriate tools 168 are attached to the spindle units 120, which are then installed so that their axes 170 are aligned with the workpiece.

Once this initial setup of the assembly 110 is completed, the first machining process is performed on the raw workpiece. The initial configuration of the assembly 110 is set up to perform only processes that can be accomplished by axial movement of the tools 168 as they rotate and by horizontal and vertical movement of the table 114 (if controlled by a motor). Therefore, the present invention permits reduction in cost since it does not include axes of motion that are not utilized during the machining of a particular part process or series.

The reconfigurable machine tool assembly 110 combines the active degrees of freedom driven by the motors with the passive degrees of freedom that are manually reconfigured to achieve the necessary customized flexibility required for each step in the machining process. These active and passive degrees of freedom are combined in a series or parallel manner. One or more passive degrees of freedom can be coupled to one or more active degrees of freedom to produce the desired results.

Upon completion of the first series of machining operations, the assembly 110 can easily be reconfigured for the subsequent series of parts by moving the support units 116 and 118 to other locator slots 124 and apertures 126, which provide discrete location fixing; and moving the spindle units 120 along the grooves 150 and 156, which provide continuously variable position fixing. As stated above, the spindle units 120 can also be easily converted by replacing one tool 168 with another that accomplished a different process. This easy reconfiguration allows rapid changes in the machine structure and rapid conversion of the machine assembly by simply relocating its basic building modules. This also allows the machine assembly 110 to perform a variety of machining processes and to machine a variety of part geometries with a small number of controlled axes of motion. Because the workpiece is fixed to the table 114 and the support units 116 and 118 are rigidly secured to the base 112, sufficient rigidity of the assembly 110 is achieved to meet tight design tolerances.

The two or more support units 116 and 118 also allow machining processes to be performed in multiple planes simultaneously, instead of the current method of aligning single axis machining units on opposite sides of a workpiece so that the machining process can only be performed in one plane or in parallel planes during a specified process. The spindle units along the column support unit 116 perform tasks in the vertical plane, or in a plane offset from vertical if a pivot or shaft is utilized, while the spindle units along the horizontal support unit 118 simultaneously perform tasks in the horizontal plane.

The present invention also allows the use of several tools 168 that operate simultaneously, thereby increasing the productivity, and thus the economic benefit, of the assembly. The end result is that the assembly 110, including all possible configurations, can access more points on a part than a five-axis CNC machining center, and has higher productivity than a single-tool CNC machine. This is accomplished at a greatly reduced cost because the present invention does not have the general flexibility of a five-axis CNC machine, but rather has only customized flexibility to accommodate geometric and machining peculiarities of each part to be processed.

An alternate embodiment (not shown) of the present invention includes a spindle unit that is equipped with a chuck, rather than a tool, that holds and rotates a workpiece. A cutting tool is attached to the table and moves in a direction parallel to the axis of the spindle to perform a turning operation. The cutting tools of other spindles may also engage in the cutting of the rotating part to cut profiles on the rotating part.

Figure 18:
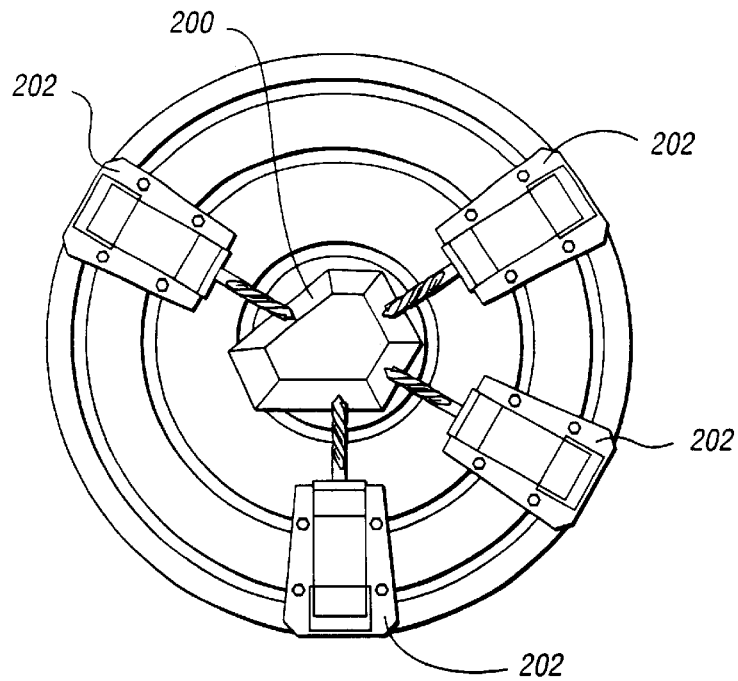
FIG. 18 is a top plan view of a reconfigurable machine tool. Single-axis spindle modules are basic building blocks that can be rapidly installed around the part at different angles. The part moves in an axis vertical to the shown plan.

Consider as another example the conceptual reconfigurable machine depicted in FIG. 18. In this example, several cutting tools attached to four spindles 202 operate simultaneously on a part 200. The part 200 may move up and down and rotate. The reconfiguration from product A to product B requires a change of the number of spindles 202 and their location on the machines. This machine does not have the general flexibility of a multi-axis CNC machine, but has only a customized flexibility that changes with the configuration, and fits a part family that requires side-drilling at different angles and turning operation (one of the spindles can be stationary and holds a turning cutting tool, while the part rotates and moves up and down).

The challenge in designing reconfigurable machines is to extract the key geometric features of several parts from a part family and to design a machine that can produce all these parts. The concept of design for a part family is the essence in designing a reconfigurable machine and reconfigurable system. If a capability to machine any arbitrary part is required, then FMS rather than RMS is the desired solution.

Reconfigurable Controllers

Figure 19:
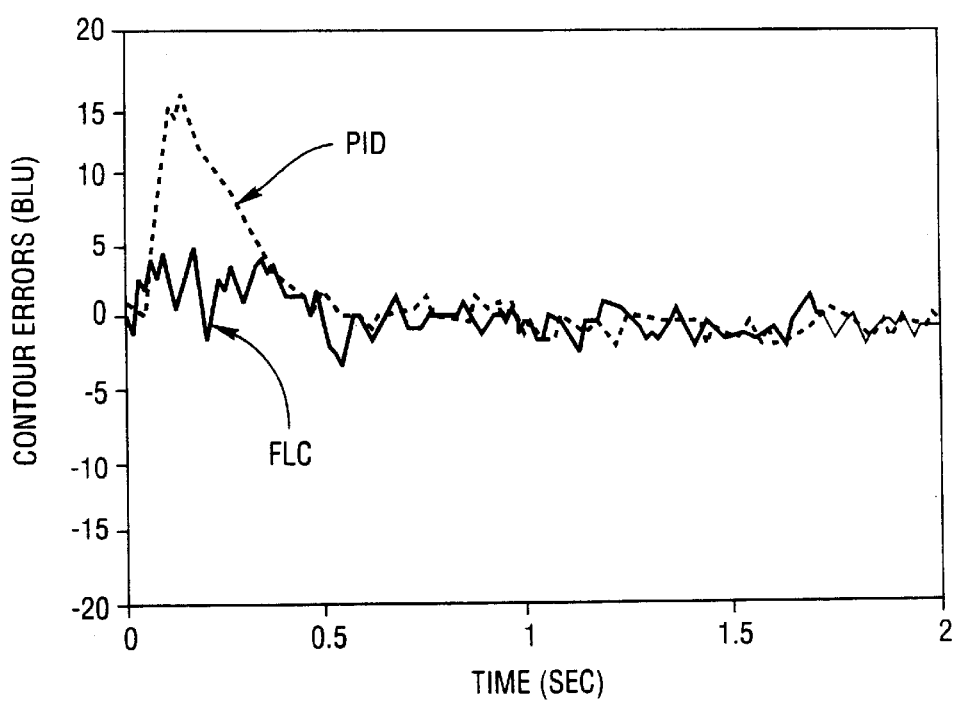
FIG. 19 is a graph comparing contour error reduction with fuzzy logic control (FLC) with proportional-integral-derivative (PID) control.

Reconfigurable machines must be designed to be reconfigurable in terms of their communications and control functions, as well as their mechanical motion and material processing functions. This requires plug and play hardware and software modules, based on real-time open-architecture principles [Koren et al 1996]. For example, an existing servocontrol module for axis motion control might be upgraded to include a superior algorithm that includes friction compensation. This is illustrated in FIG. 19, which shows a factor of 3 reduction in maximum contour errors when machining with a fuzzy logic control (FLC) as compared to a traditional PID servocontroller. Such a change can improve the quality of the machined part, thus, making the machine with the new controller suitable for a new product that has higher quality requirements.

Figure 20:
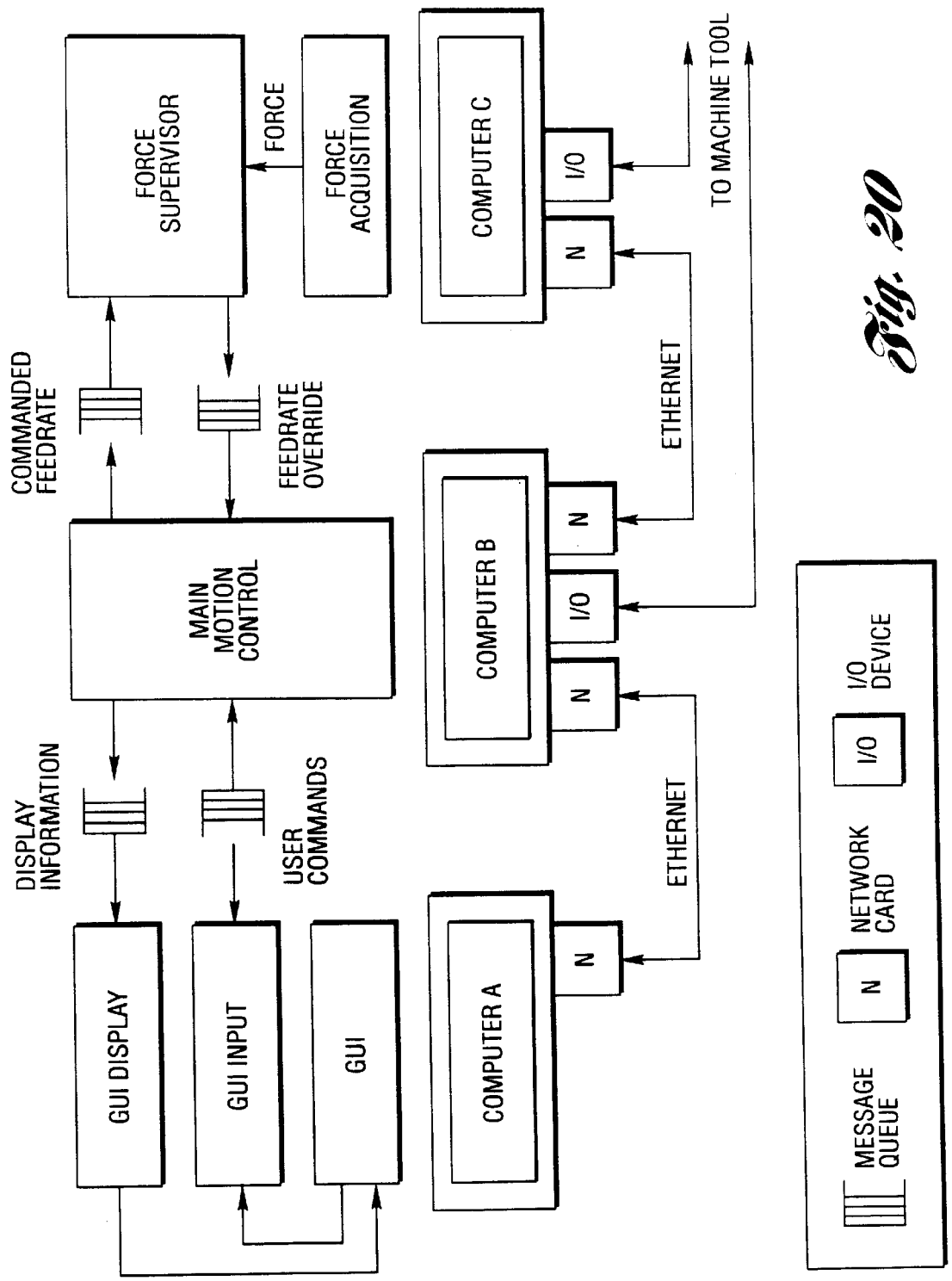
FIG. 20 is a schematic block diagram illustrating the structure of a modular, reconfigurable multi-processor control system.

Changes in control algorithms must be accomplished without interfering with other control modules (e.g., interpolator, force controller, error compensation) and without compromising the quality and productivity of the machine due to changes in the sampling rates. This requires a software architecture that supports modularity and real-time constraints, and can map the control functions to one or more processors as needed. This is illustrated in FIG. 20, where a modular, multi-processor architecture is used. The first processor is used for man-machine interactions and the operator interface. A second processor handles the motion (or servo) control functions, and a third processor handles process control functions such as force control.

Just like reconfigurable machines are modular, so is the reconfigurable controller. This leads to the concept of reusable software assets which are developed and also stored in a library for reuse (see FIG. 9).

In addition to the definition of software modules, and their storage in a library for reuse, it is necessary to have software tools for their integration. Such a software tool can be termed a control configurator, and is a visual, or graphical, programming environment where the control software modules can be assembled into a complete software package, tested in simulation, then downloaded to the reconfigurable controller for actual implementation. It is also necessary to support system level reconfiguration by enabling engineers to rapidly modify the discrete-event logic that coordinates and controls the sequence of operations that occur as a product moves through a production line. This can be accomplished in a manner similar to the reusable software assets concept described above. However, in this case the software assets are discrete-event control logic modules in a standard format (e.g. petri nets or grafcet).

As described above, a reconfigurable manufacturing system (RMS) of the present invention is a manufacturing system designed at the outset (as explained above) for rapid adjustment of production capacity and functionality, in response to new circumstances, by rearrangement or basic change of its structure and its hardware and software components, and which possesses the key characteristics of modularity, integrability, customization, convertability, and diagnosability. The RMS is capable of producing any one, or several, parts from the same part-family, and of adjusting its production volume or capacity for each part is produces.

The RMS typically includes a plurality of computer numerically controlled (CNC) workstations and at least one reconfigurable workstation, which are each provided with a plurality of part programs. Each of the CNC workstations and the reconfigurable workstation execute a selected one of said part programs in response to a supervisory program located at the operator station 16 that coordinates the system production.

A reconfigurable material handling system, controlled by a computer, is coupled to each of the workstations. The RMS is operable in different system configurations: serial, parallel, or hybrid combinations of serial-parallel, to perform coordinated work operations on a part or a product, and is constructed (as explained below), including reconfiguration and ramp-up, to be responsive to changes in market demand.

As also described above, the present invention includes a methodology, including its realization in computer-aided design software, for the system-level design of the above RMS. The methodology is based upon the steps shown in FIGS. 5 and 7, such that for a particular part-family, with known product features and given production volume and quality requirements, machining operations to produce these parts are selected, using machining and machine tool module databases. Also, feasible configurations of the machines that make up the system are generated, and evaluated for their effect on system throughput, quality, reliability, and convertability. Life cycle economic analysis is used to select the best economical system configuration.

As further described above, methodology, including its realization in computer-aided design software, for the machine-level design of the above RMS is provided. The methodology is based upon the steps shown in FIGS. 5 and 9, such that the resulting reconfigurable machine tool, or workstation, is modular, and the modules are either selected from an existing database of reusable machine modules, or a new module is created and added to that database for later reuse. Each of the modules are integratable, customized for a part family, readily convertible and diagnosable. The modules, for both the machine and its controller, are configured into one or more feasible machining workstations that can meet the specifications determined from the system-level design described above.

A process plan (i.e. sequence of operations, their feeds, speeds and depths of cut) is generated for each of the feasible designs, and an optimal reconfigurable workstation design, including a reconfigurable controller, is selected from among the feasible designs generated.

As described above, a methodology, including its realization in computer-aided design software, for the ramp-up of the above RMS is provided. This methodology is based upon the steps shown in FIGS. 6 and 10, such that the appropriate number and location of sensors is established for measuring part quality, such that the sources in the production system of the party quality errors can be determined, and the appropriate diagnostics is carried out on the sensor data, based on statistical analysis and process knowledge. Based on the diagnostics, a root-cause analysis is carried out to determine the causes of the quality problems, and compensation, including manual or automatic calibration, is performed to correct the faults that are causing the product quality problems being measured.

As also described above, a methodology, including its realization in computer-aided design software, for design, or re-design, of the above RMS is provided. This methodology is based upon the steps shown in FIG. 5, such that the need for RMS is established based upon product understanding and market forecasts, using life-cycle economic analysis. If a new RMS is needed, then a system-level design of the RMS (as described above) is performed, and then the requirements from that system-level design are used in a machine-level design of the RMS (as also described above) to obtain the final design for the RMS.

As further described above, a methodology, including its realization in computer-aided design software, for the operation of the above RMS is provided. This methodology includes its reconfiguration and ramp-up, based upon the steps shown in FIG. 6, such that market conditions are continually monitored to determine if there is a need to change the production system capacity or functionality, and if such changes are needed, then the system is reconfigured by performing a system-level re-design, using the methodology for system-level design described above. Then the requirements from that system level re-design are used in a machine-level re-design of the RMS (as described above) to obtain the final design for the RMS reconfiguration. The reconfigured system is quickly ramped-up to high-quality, full volume production using the ramp-up methodology described above.

The reconfigurable material handling system may include a plurality of transport vehicles, movable on programmed path trajectories and operable in response to command signals from the supervisory program, and adapted to receive different parts and transport them about the reconfigurable manufacturing system.

The reconfigurable material handling system may include a modular conveyor that is easily reconfigured to operate in a new system configuration as noted above. The modular conveyor typically includes standard conveyor modules and means to connect them to each other and means to attach them to the workstations.

The RMS also preferably includes a reconfigurable system diagnostics network that transfers diagnostic signals from the module-controller level and the controllers of the workstations and the transport vehicles to the supervisory program to reduce ramp-up time after each new configuration.

While the best mode for carrying out the invention has been described in detail, those familiar with the art to which this invention relates will recognize various alternative designs and embodiments for practicing the invention as defined by the following claims.

What is claimed is:

1. A reconfigurable manufacturing system (RMS) having an adjustable structure to quickly change from a first desired production capacity to a second desired production capacity to manufacture a desired mix of products from a family of products, the system comprising:
   a plurality of work stations including reconfigurable machines;
   a control system including a plurality of reconfigurable controllers for controlling the reconfigurable machines; and
   a reconfigurable material handling system in communication with the control system for transporting material or parts between the work stations, wherein the reconfigurable machines and controllers are modular to permit rapid and reliable integration of the machines and controllers during a change in the structure of the RMS so that the RMS will have the second desired production capacity.

2. The RMS as claimed in claim 1 wherein the adjustable structure of the RMS also allows the RMS to quickly change from a first functionality to a second functionality.

3. The RMS as claimed in claim 1 wherein the material handling system includes a plurality of conveyor modules for moving parts or materials between the work stations.

4. The RMS as claimed in claim 1 wherein the material handling system includes a plurality of wireless-controlled transport vehicles for moving parts or materials between the work stations.

5. The RMS as claimed in claim 1 wherein the machines include modular machine tools.

6. The RMS as claimed in claim 1 wherein the controllers include open-architecture controls.

7. The RMS as claimed in claim 1 wherein the machines, the controllers and the material transport system all obey an open standard so that the machines, the controllers and the material transport system can be improved and upgraded rather than replaced.

8. The RMS as claimed in claim 1 wherein at least one of the machines is a CNC machine.

9. The RMS as claimed in claim 1 wherein at least one of the machines is a machine having reconfigurable hardware components.

10. The RMS as claimed in claim 1 wherein at least one of the controllers is a controller having reconfigurable software components or modules.

11. The RMS as claimed in claim 1 wherein each of the controllers, the machines and the material transport system has an interface to permit rapid and reliable mechanical and electrical integration with the rest of the RMS.

12. The RMS as claimed in claim 1 wherein the family of products has at least one dominant feature and wherein the controllers and the machines are customized to fit the at least one dominant feature.

13. The RMS as claimed in claim 12 wherein the machines are configured to fit the at least one dominant feature.

14. The RMS as claimed in claim 12 wherein each of the controllers includes control modules integrated into an open controller platform.

15. The RMS as claimed in claim 1 further comprising a communication system for communicating with the machines, the controllers and the material handling system.

16. The RMS as claimed in claim 15 further comprising a quality measurement system in communication with the communication system for measuring part or product quality after a change in the structure of the RMS.

17. The RMS as claimed in claim 1 wherein the work stations are configured in parallel.

18. The RMS as claimed in claim 1 wherein the work stations are configured in series.

19. The RMS as claimed in claim 1 wherein the work stations have a hybrid configuration of serial-parallel.

20. The RMS as claimed in claim 16 wherein the quality measurement system includes a plurality of sensor modules, each of the sensor modules being associated with the part being produced, or with one or more of the machines, to provide corresponding sensor information to identify errors or faults via a test or calibration part.

21. The RMS as claimed in claim 1 wherein at least one of the machines includes a plurality of single axis drive modules.

22. The RMS as claimed in claim 21 wherein a controller for the at least one machine is a distributed controller having high bandwidth communication.

23. The RMS as claimed in claim 1 wherein at least one of the machines is capable of performing machining or other manufacturing operations.

24. The RMS as claimed in claim 1 further comprising a reconfigurable system diagnostics network coupled to the controllers and the material handling system to diagnose errors or faults in the RMS for calibration of the RMS.

25. A computer-implemented method for designing the reconfigurable manufacturing system (RMS) of claim 1 to have the first desired production capacity, the method comprising the steps of:

storing a life cycle economic analysis program in a computer to obtain a programmed computer;

utilizing the programmed computer to determine whether an RMS is needed based on product information and market forecasts;

performing a system level design for the RMS if the RMS is needed to obtain requirements; and performing a machine level design for the RMS based on the requirements to obtain a final design for the RMS.

26. The method as claimed in claim 25 wherein the step of performing the system level design includes the step of designing the RMS to include subsystems that can be readily re-integrated into different RMS configurations.

27. The method as claimed in claim 25 wherein the step of performing the machine level design includes the step of designing each subsystem to be modular, integratable, customized, convertable, and diagnosable.

28. A computer-implemented method for changing the production capacity of the RMS of claim 1, the method comprising the steps of:

monitoring market conditions for the family of products to obtain market information;

determining if it is desirable to reconfigure the RMS;

if it is desirable to reconfigure the RMS, reconfiguring the RMS at system and machine levels, and ramping up the reconfigured RMS to obtain the second desired production capacity.

29. The method as claimed in claim 28, wherein the step of ramping up includes the steps of:

measuring the reconfigured RMS at the machine level to obtain at least one machine measurement signal;

processing the at least one machine measurement signal to obtain a diagnostic signal; and modifying the reconfigured RMS based on the diagnostic signal.

30. The method as claimed in claim 29 wherein the step of ramping up further includes the steps of:

operating the reconfigured RMS to obtain a product;

measuring the product to obtain at least one product measurement signal;

processing the at least one product measurement signal to obtain a second diagnostic signal; and modifying the reconfigured RMS based on the second diagnostic signal.

* * * * *